US012795610B2

(12) United States Patent
Sarkis et al.

(10) Patent No.: US 12,795,610 B2
(45) **Date of Patent: *Nov. 10, 2026**

(54) TRANSMITTING RESOURCE COLLISION INDICATION ON SIDELINK FEEDBACK CHANNEL

(71) Applicant: QUALCOMM Incorporated, San Diego, CA (US)

(72) Inventors: Gabi Sarkis, San Diego, CA (US); Tien Viet Nguyen, Bridgewater, NJ (US); Sourjya Dutta, San Diego, CA (US); Kapil Gulati, Belle Mead, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 18/360,077

(22) Filed: Jul. 27, 2023

(65) Prior Publication Data

US 2024/0015701 A1 Jan. 11, 2024

Related U.S. Application Data

(63) Continuation of application No. 17/443,226, filed on Jul. 22, 2021, now Pat. No. 11,758,517.
(Continued)

(51) Int. Cl.
*H04W 72/20* (2023.01)
*H04L 1/1867* (2023.01)
(Continued)

(52) U.S. Cl.
CPC ........... *H04W 72/02* (2013.01); *H04L 1/1896* (2013.01); *H04W 72/1263* (2013.01); *H04W 72/566* (2023.01); *H04W 92/18* (2013.01)

(58) Field of Classification Search
CPC ... H04L 1/1671; H04L 1/1887; H04L 1/1896; H04W 72/02; H04W 72/1263;
(Continued)

(56) References Cited

U.S. PATENT DOCUMENTS 11,503,640 B2 * 11/2022 Lee .................. H04W 74/0825
11,937,265 B2 * 3/2024 Farag .................. H04W 72/23
(Continued)

FOREIGN PATENT DOCUMENTS

CN 110944390 A 3/2020
EP 3565351 A1 11/2019
(Continued)

OTHER PUBLICATIONS

International Search Report and Written Opinion—PCT/US2021/070945—ISA/EPO—Nov. 16, 2021.
(Continued)

*Primary Examiner* — Phuc H Tran
(74) *Attorney, Agent, or Firm* — Harrity & Harrity, LLP

(57) ABSTRACT

Various aspects of the present disclosure generally relate to wireless communication. In some aspects, a first user equipment (UE) may identify a collision on a victim resource based at least in part on an aggressor reservation transmitted by a second UE. The first UE may transmit, to the second UE via a sidelink feedback channel, a resource collision indication that indicates at least one of the victim resource or the aggressor reservation, wherein the resource collision indication is multiplexed on one or more resources that are useable for sidelink feedback. Numerous other aspects are provided.

30 Claims, 13 Drawing Sheets

Related U.S. Application Data

(60) Provisional application No. 62/706,022, filed on Jul. 27, 2020.

(51) Int. Cl.

| | |
|---|---|
| ***H04W 72/02*** | (2009.01) |
| ***H04W 72/1263*** | (2023.01) |
| ***H04W 72/566*** | (2023.01) |
| *H04W 92/18* | (2009.01) |

(58) Field of Classification Search
CPC ... H04W 72/20; H04W 72/56; H04W 72/566; H04W 92/18
See application file for complete search history.

(56) References Cited

U.S. PATENT DOCUMENTS

2017/0188391 A1 6/2017 Rajagopal et al.
2020/0099479 A1 3/2020 Park
2020/0267767 A1 8/2020 Lee et al.
2020/0305176 A1 9/2020 Hu et al.
2021/0250913 A1 8/2021 Ganesan et al.
2021/0400681 A1* 12/2021 Wang .................... H04W 72/02
2021/0410126 A1* 12/2021 Ganesan ............... H04L 5/0014
2022/0030603 A1 1/2022 Sarkis et al.
2022/0116996 A1 4/2022 Lee et al.
2022/0210768 A1* 6/2022 Zhou ..................... H04W 72/20
2022/0279537 A1 9/2022 Freda et al.
2023/0361830 A1* 11/2023 Liu ...................... H04B 7/0626

FOREIGN PATENT DOCUMENTS

WO WO-2016163972 A1 * 10/2016 ............ H04W 72/20
WO WO-2020011336 A1 * 1/2020 ............ H04W 72/20
WO 2020061879 A1 4/2020
WO 2020088756 A1 5/2020
WO 2020107349 A1 6/2020
WO 2021098858 A1 5/2021
WO WO-2022118301 A1 * 6/2022 ............ H04W 72/20
WO WO-2023108417 A1 * 6/2023 ............ H04W 72/25

OTHER PUBLICATIONS

3GPP TS 38.214 : "3rd Generation Partnership Project, Technical Specification Group Radio Access Network, NR, Physical layer procedures for data(Release 16)", V16.0.0, Dec. 2019, Jan. 14, 2020, pp. 1-147.
Lien S-Y., et al., "3GPP NR Sidelink Transmissions Toward 5G V2X," in IEEE Access, Keywords: 3GPP, OFDM, Relays, Safety, Synchronization, Base stations, Uplink, 3GPP NR, Sidelink, V2X, Fifth Generation (5G) networks, device-to-device (D2D), vol. 8, Date of Publication Feb. 13, 2020, pp. 35368-35382.

* cited by examiner

TRANSMITTING RESOURCE COLLISION INDICATION ON SIDELINK FEEDBACK CHANNEL

CROSS-REFERENCE TO RELATED APPLICATION

This application is a continuation of U.S. Non-Provisional application Ser. No. 17/443,226, entitled "TRANSMITTING RESOURCE COLLISION INDICATION ON SIDELINK FEEDBACK CHANNEL", filed Jul. 22, 2021, which claims the benefit of Provisional Patent Application No. 62/706,022, filed on Jul. 27, 2020, entitled "TRANSMITTING RESOURCE COLLISION INDICATION ON SIDELINK FEEDBACK CHANNEL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for transmitting a resource collision indication on a sidelink feedback channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes: identifying a collision on a victim resource based at least in part on an aggressor reservation transmitted by a second UE; and transmitting, to the second UE via a sidelink feedback channel, a resource collision indication that indicates at least one of the victim resource or the aggressor reservation, wherein the resource collision indication is multiplexed on one or more resources that are useable for sidelink feedback.

In some aspects, a method of wireless communication performed by a first UE includes: determining that transmission or reception of a resource collision indication associated with a second UE conflicts with another communication of the first UE, wherein the resource collision indication is transmitted or received via a sidelink feedback channel; and transmitting or receiving at least one of the resource collision indication or the other communication based at least in part on one or more priority rules.

In some aspects, a method of wireless communication performed by a first UE includes: receiving, from a second UE via a sidelink feedback channel, a resource collision indication that indicates at least one of a victim resource or an aggressor reservation transmitted by the first UE, wherein the resource collision indication is multiplexed on one or more resources that are useable for sidelink feedback; and performing an action based at least in part on the resource collision indication.

In some aspects, a first UE for wireless communication includes: a memory; and one or more processors coupled to the memory, the memory and the one or more processors configured to: identify a collision on a victim resource based at least in part on an aggressor reservation transmitted by a second UE; and transmit, to the second UE via a sidelink feedback channel, a resource collision indication that indicates at least one of the victim resource or the aggressor reservation, wherein the resource collision indication is multiplexed on one or more resources that are useable for sidelink feedback.

In some aspects, a first UE for wireless communication includes: a memory and one or more processors coupled to the memory, the memory and the one or more processors configured to: determine that transmission or reception of a resource collision indication associated with a second UE conflicts with another communication of the first UE, wherein the resource collision indication is transmitted or received via a sidelink feedback channel; and transmit or receiving at least one of the resource collision indication or the other communication based at least in part on one or more priority rules.

In some aspects, a first UE for wireless communication includes: a memory and one or more processors coupled to the memory, the memory and the one or more processors configured to: receive, from a second UE via a sidelink feedback channel, a resource collision indication that indicates at least one of a victim resource or an aggressor reservation transmitted by the first UE, wherein the resource collision indication is multiplexed on one or more resources that are useable for sidelink feedback; and perform an action based at least in part on the resource collision indication.

In some aspects, a non-transitory computer-readable medium storing a set of instructions for wireless communication includes: one or more instructions that, when executed by one or more processors of a first UE, cause the first UE to: identify a collision on a victim resource based at least in part on an aggressor reservation transmitted by a second UE; and transmit, to the second UE via a sidelink feedback channel, a resource collision indication that indicates at least one of the victim resource or the aggressor reservation, wherein the resource collision indication is multiplexed on one or more resources that are useable for sidelink feedback.

In some aspects, a non-transitory computer-readable medium storing a set of instructions for wireless communication includes: one or more instructions that, when executed by one or more processors of a first UE, cause the first UE to: determine that transmission or reception of a resource collision indication associated with a second UE conflicts with another communication of the first UE, wherein the resource collision indication is transmitted or received via a sidelink feedback channel; and transmit or receiving at least one of the resource collision indication or the other communication based at least in part on one or more priority rules.

In some aspects, a non-transitory computer-readable medium storing a set of instructions for wireless communication includes: one or more instructions that, when executed by one or more processors of a first UE, cause the first UE to: receive, from a second UE via a sidelink feedback channel, a resource collision indication that indicates at least one of a victim resource or an aggressor reservation transmitted by the first UE, wherein the resource collision indication is multiplexed on one or more resources that are useable for sidelink feedback; and perform an action based at least in part on the resource collision indication.

In some aspects, a first apparatus for wireless communication includes: means for identifying a collision on a victim resource based at least in part on an aggressor reservation transmitted by a second apparatus; and means for transmitting, to the second apparatus via a sidelink feedback channel, a resource collision indication that indicates at least one of the victim resource or the aggressor reservation, wherein the resource collision indication is multiplexed on one or more resources that are useable for sidelink feedback.

In some aspects, a first apparatus for wireless communication includes: means for determining that transmission or reception of a resource collision indication associated with a second apparatus conflicts with another communication of the first apparatus, wherein the resource collision indication is transmitted or received via a sidelink feedback channel; and means for transmitting or receiving at least one of the resource collision indication or the other communication based at least in part on one or more priority rules.

In some aspects, a first apparatus for wireless communication includes: means for receiving, from a second apparatus via a sidelink feedback channel, a resource collision indication that indicates at least one of a victim resource or an aggressor reservation transmitted by the first apparatus, wherein the resource collision indication is multiplexed on one or more resources that are useable for sidelink feedback; and means for performing an action based at least in part on the resource collision indication.

In some aspects, a method, device, apparatus, computer program product, non-transitory computer-readable medium, user equipment, base station, node, wireless communication device, and/or processing system as substantially described herein with reference to and as illustrated by the accompanying drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
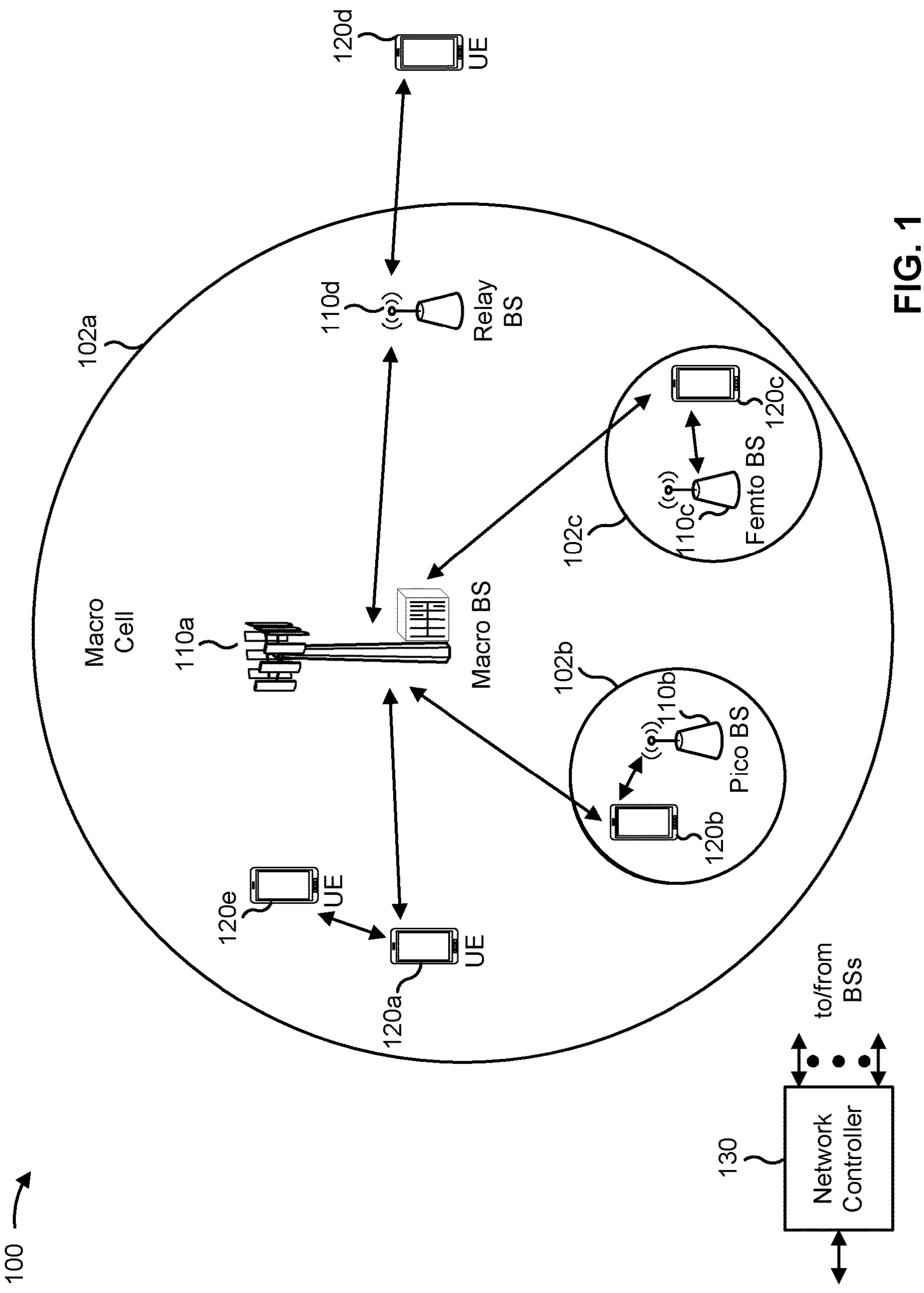
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like.

A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, a first UE 120*a* may identify a collision on a victim resource based at least in part on an aggressor reservation transmitted by a second UE 120*e*. The first UE 120*a* may transmit, to the second UE 120*e* via a sidelink feedback channel, a resource collision indication that indicates at least one of the victim resource or the aggressor reservation. The resource collision indication may be multiplexed on one or more resources that are useable for sidelink feedback.

In some aspects, a first UE 120*a* may determine that transmission or reception of a resource collision indication associated with a second UE 120*e* conflicts with another communication of the first UE 120*a*. The resource collision indication may be transmitted or received via a sidelink feedback channel. The first UE 120*a* may transmit or receive at least one of the resource collision indication or the other communication based at least in part on one or more priority rules.

In some aspects, a first UE 120*a* may receive, from a second UE 120*e* via a sidelink feedback channel, a resource collision indication that indicates at least one of a victim resource or an aggressor reservation transmitted by the first UE 120*a*. The resource collision indication may be multiplexed on one or more resources that are useable for sidelink feedback. The first UE 120*a* may perform an action based at least in part on the resource collision indication.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
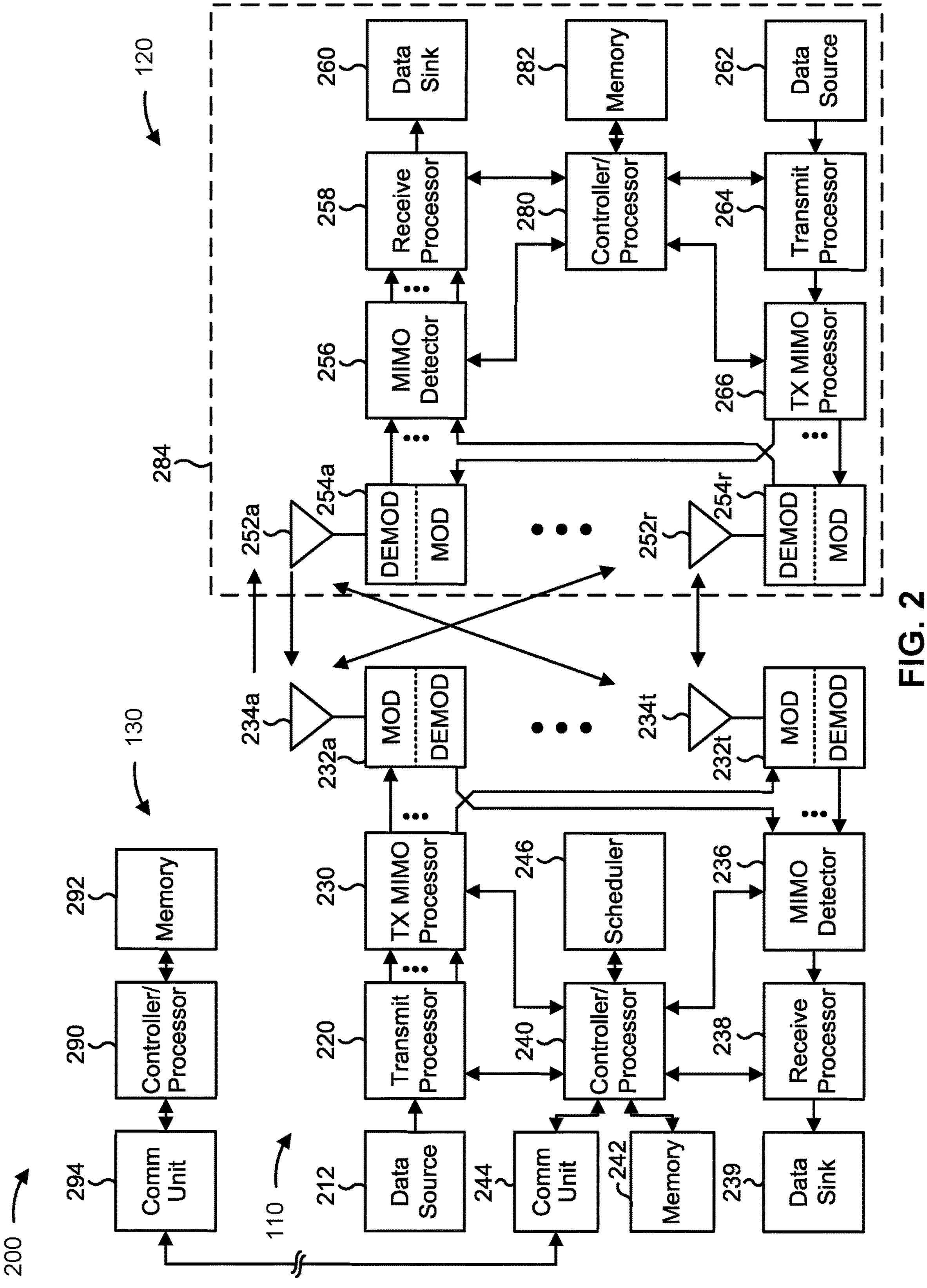
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-12).

Controller/processor 240 of base station 110, controller/processor 280 of UE 120, and/or any other component(s) of FIG. 2 may perform one or more techniques associated with transmitting a resource collision indication on a sidelink feedback channel, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, a first UE (e.g., UE 120) may include means for identifying a collision on a victim resource based at least in part on an aggressor reservation transmitted by a second UE, and/or means for transmitting, to the second UE via a sidelink feedback channel, a resource collision indication that indicates at least one of the victim resource or the aggressor reservation, wherein the resource collision indication is multiplexed on one or more resources that are useable for sidelink feedback. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a first UE (e.g., UE 120) may include means for determining that transmission or reception of a resource collision indication associated with a second UE conflicts with another communication of the first UE, wherein the resource collision indication is transmitted or received via a sidelink feedback channel; and/or means for transmitting or receiving at least one of the resource collision indication or the other communication based at least in part on one or more priority rules. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a first UE (e.g., UE 120) may include means for receiving, from a second UE via a sidelink feedback channel, a resource collision indication that indicates at least one of a victim resource or an aggressor reservation transmitted by the first UE, wherein the resource collision indication is multiplexed on one or more resources that are useable for sidelink feedback; and/or means for performing an action based at least in part on the resource collision indication. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
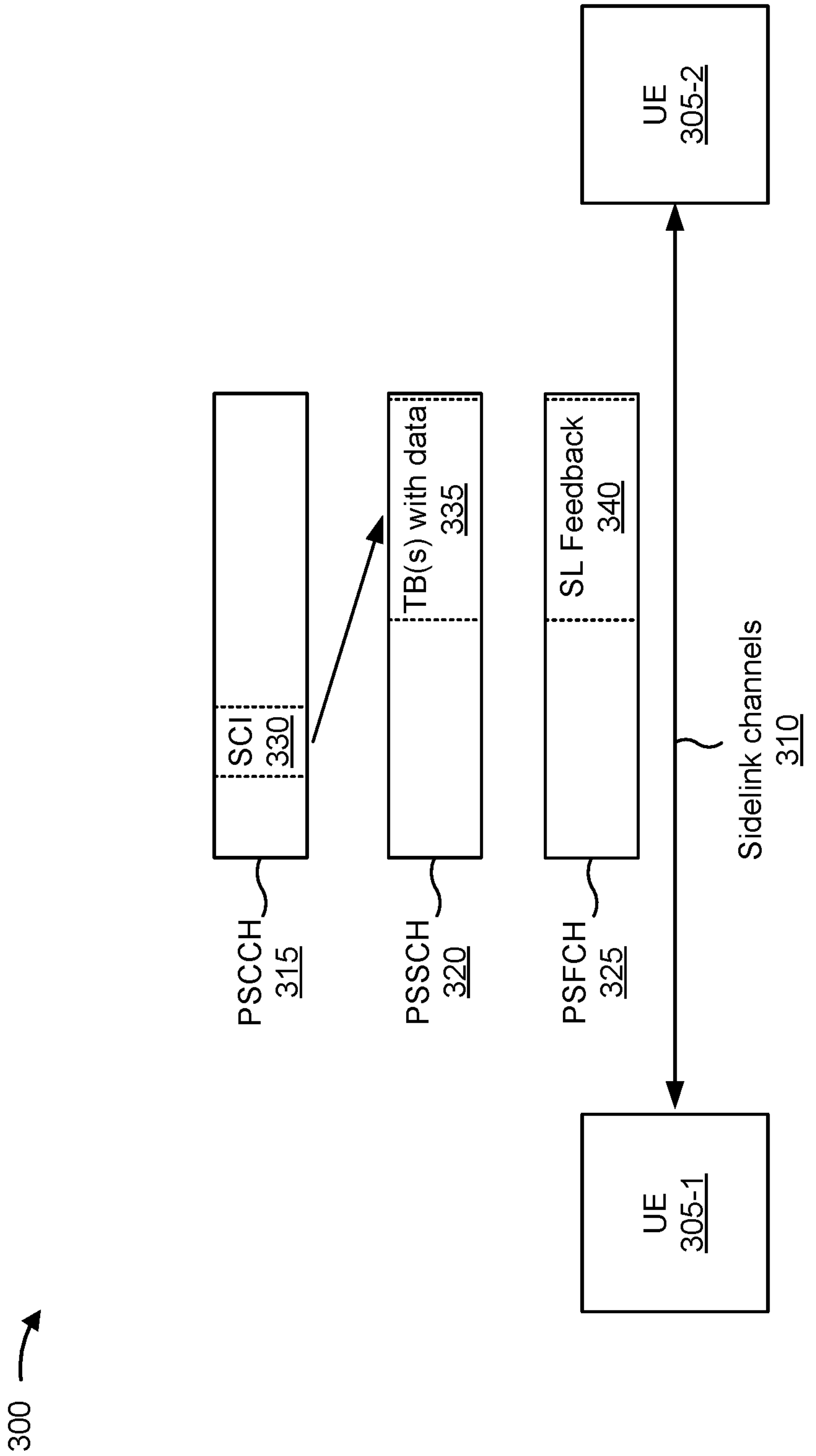
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-person (V2P) communications), and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
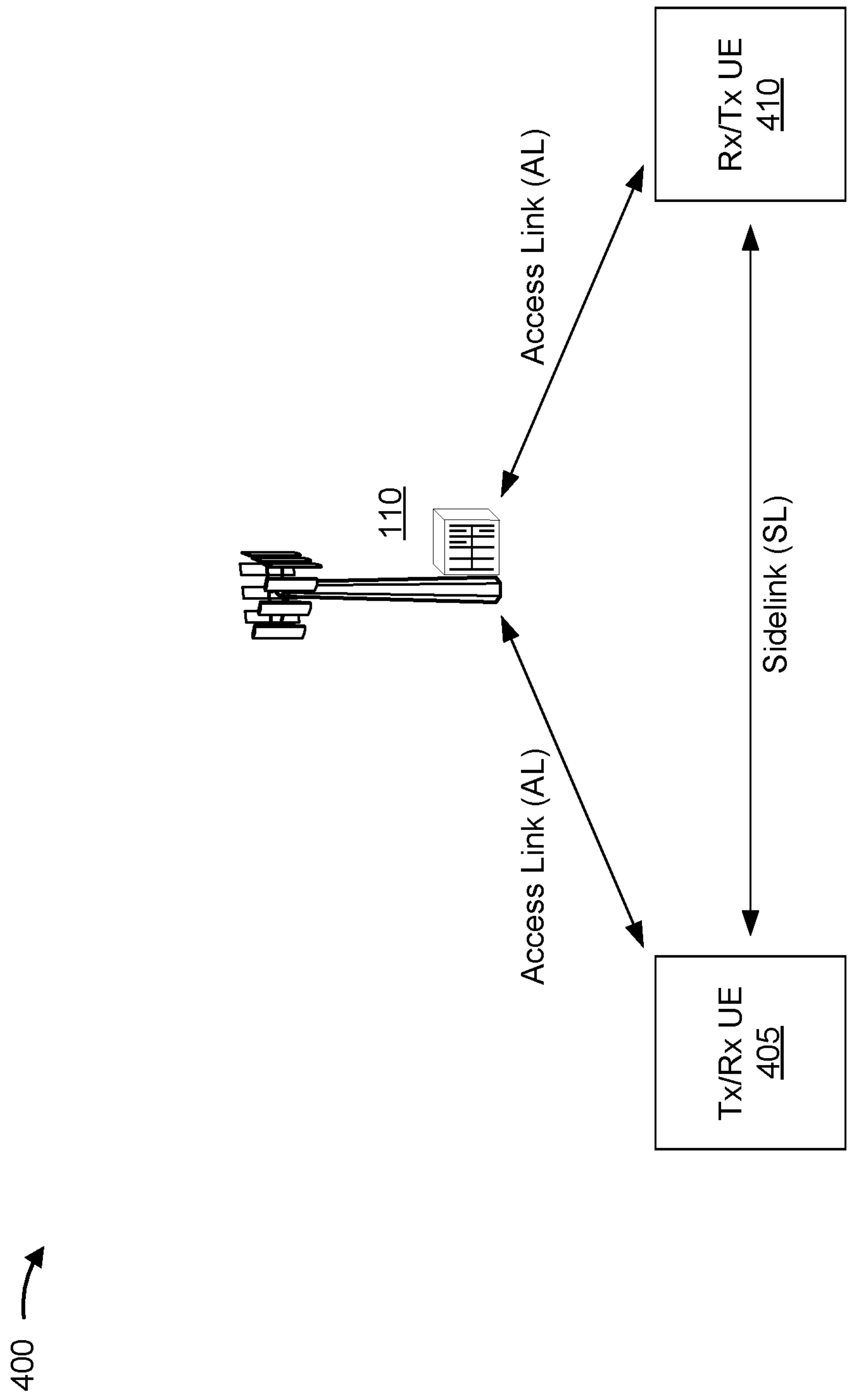
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
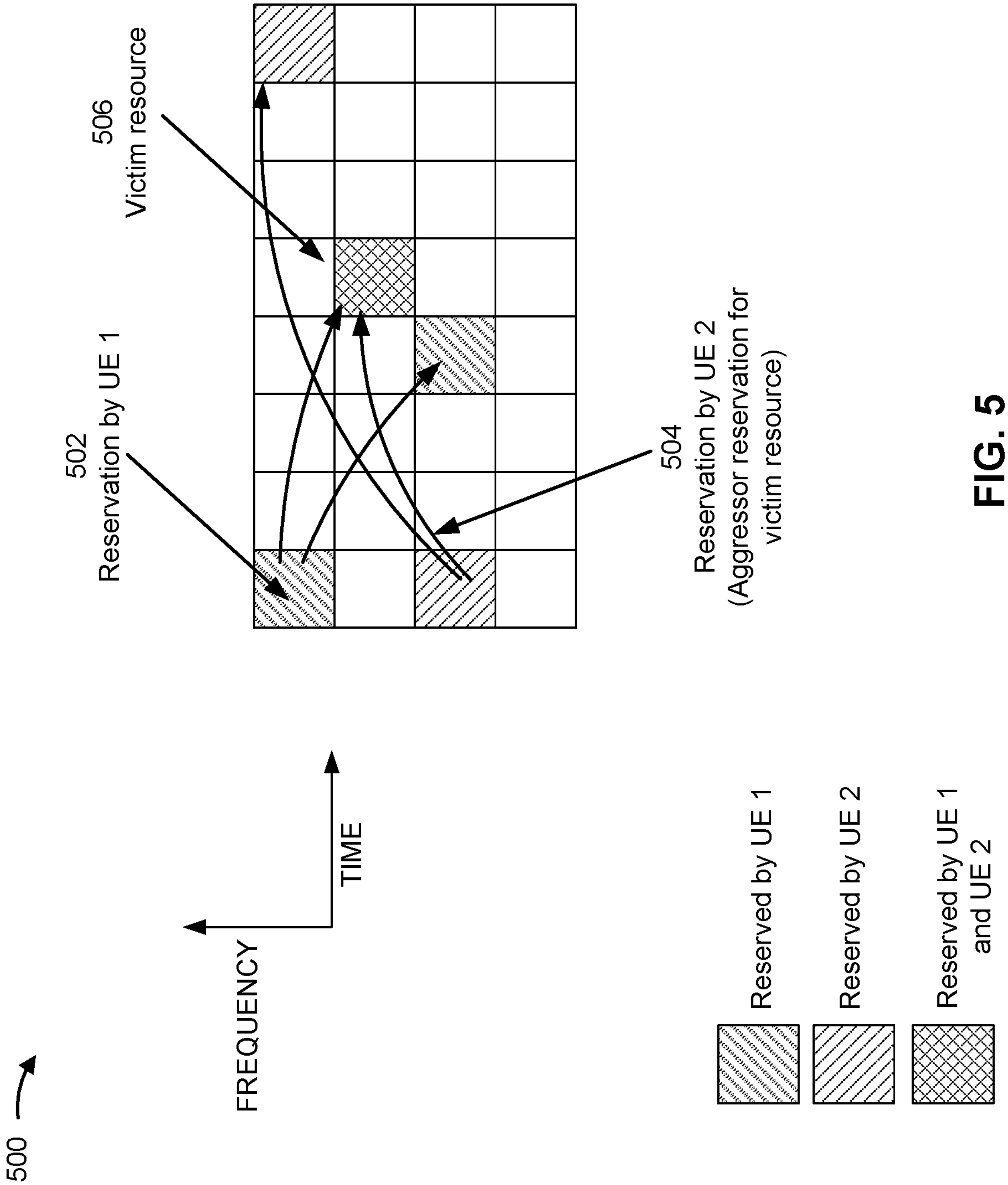
FIG. 5 is a diagram illustrating an example of an aggressor reservation for a victim resource, in accordance with the present disclosure.

FIG. 5 is a diagram illustrating an example 500 of an aggressor reservation for a victim resource, in accordance with the present disclosure.

A UE may transmit a reservation for sidelink resource allocation in a New Radio sidelink. The sidelink resource allocation may be in units of sub-channels in a frequency domain. The sidelink resource allocation may be limited to one slot in a time domain. In other words, a sidelink resource may include a frequency domain resource (e.g., one or more sub-channels), and/or a time domain resource (e.g., one or more slots). The UE may transmit the reservation in a previously reserved resource, and the reservation may reserve sidelink resources in up to two slots that are later in time, as compared to the previously reserved resource in which the reservation is transmitted from the UE. The UE may transmit the reservation for sidelink resources in sidelink control information (SCI) via a physical sidelink control channel (PSCCH).

As shown in FIG. 5, a first UE (UE 1) may transmit a first reservation 502 for resource allocation and a second UE (UE 2) may transmit a second reservation 504 for resource allocation. For example, the first UE may transmit the first reservation 502 to reserve two sidelink resources that are later in time, and the second UE may transmit the second reservation 504 to reserve two sidelink resources that are later in time. In this example, the first UE and the second UE may attempt to reserve a same sidelink resource. This same sidelink resource may be considered to be a victim resource 506, which is a resource involved in a conflict. The first reservation 502 transmitted by the first UE or the second reservation 504 transmitted by the second UE may be considered to be an aggressor reservation, due to causing a conflict between the first UE and the second UE with respect to the victim resource 506.

In some aspects, a collision or conflict may involve a full overlap in frequency between resources (e.g., between two resources). Alternatively, a collision or conflict may involve a partial overlap in frequency between resources.

As indicated above, FIG. 5 is provided as an example. Other examples may differ from what is described with respect to FIG. 5.

Figure 6:
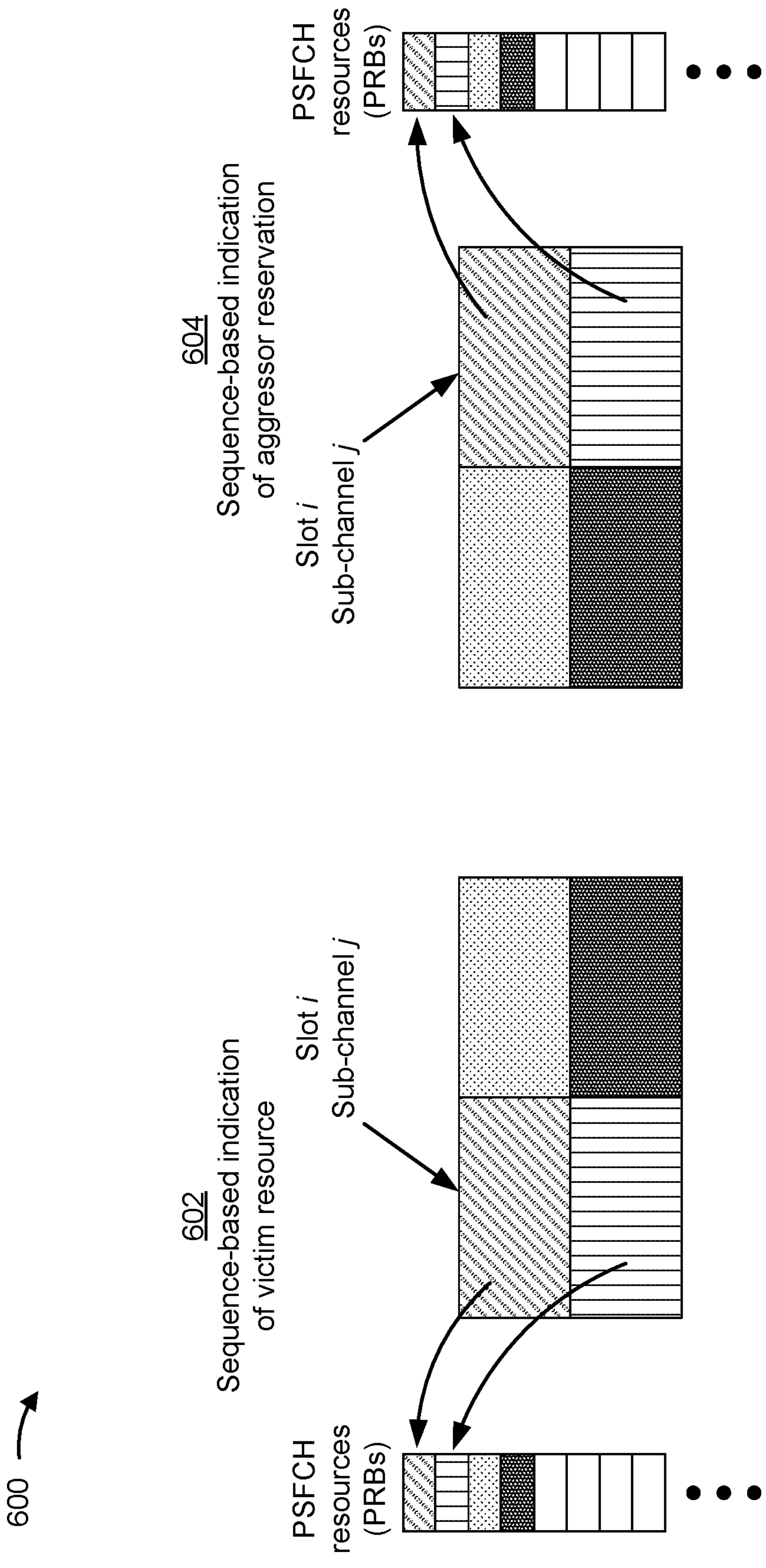
FIG. 6 is a diagram illustrating an example of a resource collision indication, in accordance with the present disclosure.

FIG. 6 is a diagram illustrating an example 600 of a resource collision indication, in accordance with the present disclosure.

In some aspects, the first UE may send a resource collision indication to the second UE, or vice versa. The resource collision indication may indicate the sidelink resource that is in conflict (e.g., a victim resource) between the first UE and the second UE. The sidelink resource may be in conflict in a time domain and/or in a frequency domain. Additionally or alternatively, the resource collision indication may indicate the reservation (e.g., an aggressor reservation) that caused the conflict between the first UE and the second UE. In other words, the resource collision indication may be a sequence that indicates the victim resource, or the resource collision indication may be a sequence that indicates the aggressor reservation.

In some aspects, the reservation may be transmitted or the victim resource may occur in slot i, sub-channel j of a PSSCH, where i and j are positive integers that are greater than or equal to one. The resource collision indication associated with the reservation or the victim resource may be transmitted using a sidelink resource of a PSFCH. The UE may identify the sidelink resource for transmitting the resource collision indication using a PSSCH-to-PSFCH resource mapping technique. The sidelink resource may be one or more physical resource blocks (PRBs) of the PSFCH. One PRB may be used when a one-to-one mapping is performed at the UE, or multiple PRBs may be used when a one-to-many mapping is performed at the UE.

A first Z PRBs may be associated with a first sub-channel in a first slot associated with the PSFCH, and/or a second Z PRBs may be associated with the first sub-channel in a second slot associated with the PSFCH, where Z is a positive integer greater than or equal to one. A sidelink resource of the PSFCH having an index ((K+M) mod (Z*Y)) is used for a PSFCH transmission of an Rx UE. K is a layer 1 (L1) source identifier (ID) of an associated PSCCH or an associated PSSCH (which carries the reservation). M is equal to 0 for unicast and groupcast feedback (e.g., unicast and groupcast feedback option 1), or M is a member ID of the Rx UE for groupcast feedback option 2. Y is a number of cyclic shift pairs for the PSFCH.

As shown by reference number 602, a victim resource may occur in slot i, sub-channel j of the PSSCH. In this case, a UE may perform a PSSCH-to-PSFCH resource mapping that identifies a sidelink resource of the PSFCH to be used for transmitting a resource collision indication from the UE. The resource collision indication may indicate the victim resource in the PSSCH that is to occur later in time, in relation to the transmission of the resource collision indication. The sidelink resource mapped to the PSFCH may be associated with a sub-channel in a slot of the PSSCH. The sidelink resource may be used per sub-channel of the PSFCH to indicate the source ID of the PSSCH that carries the reservation.

As shown by reference number 604, an aggressor reservation may occur in slot i, sub-channel j of the PSSCH. In this case, a UE may perform a PSSCH-to-PSFCH resource mapping that identifies a sidelink resource of the PSFCH to be used for transmitting a resource collision indication from the UE. The resource collision indication may indicate the aggressor reservation in the PSSCH that occurred earlier in time, in relation to the transmission of the resource collision indication. The sidelink resource mapped to the PSFCH may use a cyclic shift to indicate a reservation index associated with the aggressor reservation. For example, the UE may transmit a first reservation that does not cause a resource conflict and a second reservation that does cause a resource conflict (e.g., a victim resource). In this case, a cyclic shift may be used to indicate the reservation index of the first reservation or the second reservation that will cause the resource conflict.

In some aspects, the resource collision indication, irrespective of indicating the victim resource and/or the aggressor reservation, may be a sequence-based resource collision indication. The sequence-based resource collision indication used in New Radio sidelink may be similar to a sequence-based HARQ-ACK indication in New Radio sidelink. For example, a HARQ-ACK indication in New Radio sidelink may be transmitted to a UE using a mapped sidelink resource of the PSFCH.

As indicated above, FIG. 6 is provided as an example. Other examples may differ from what is described with respect to FIG. 6.

In some cases, a UE may perform a PSSCH-to-PSFCH resource mapping that identifies a sidelink resource of the PSFCH for transmitting a resource collision indication from the UE. However, a sidelink resource that is dedicated to sidelink feedback may not be mapped to when identifying sidelink resources for transmitting the resource collision indication. Such a sidelink resource may not be mapped to because the UE may not be configured to transmit the resource collision indication on a sidelink resource that is dedicated to sidelink feedback. As a result, the UE may be unable to transmit the resource collision indication on certain sidelink resources. In other words, when performing the PSSCH-to-PSFCH resource mapping, the UE may be limited in which sidelink resources may be used for transmitting the resource collision indication.

In various aspects of techniques and apparatuses described herein, the UE may multiplex a resource collision indication on a sidelink resource that is dedicated to sidelink feedback. In other words, the UE may transmit the resource collision indication on the sidelink resource that is dedicated to sidelink feedback (e.g., the sidelink resource may be useable for sidelink feedback). The resource collision indication may be a resource-collision indication and/or already-reserved indication, and the resource collision indication may be transmitted on symbols with PSFCH resources. The UE may transmit both the sidelink feedback and the resource collision indication on a sidelink resource of the PSFCH. As a result, a performance of the UE may be improved because sidelink resources that are dedicated to sidelink feedback may not be limited to sidelink feedback, but rather may be used to transmit resource collision indications as well.

Figure 7:
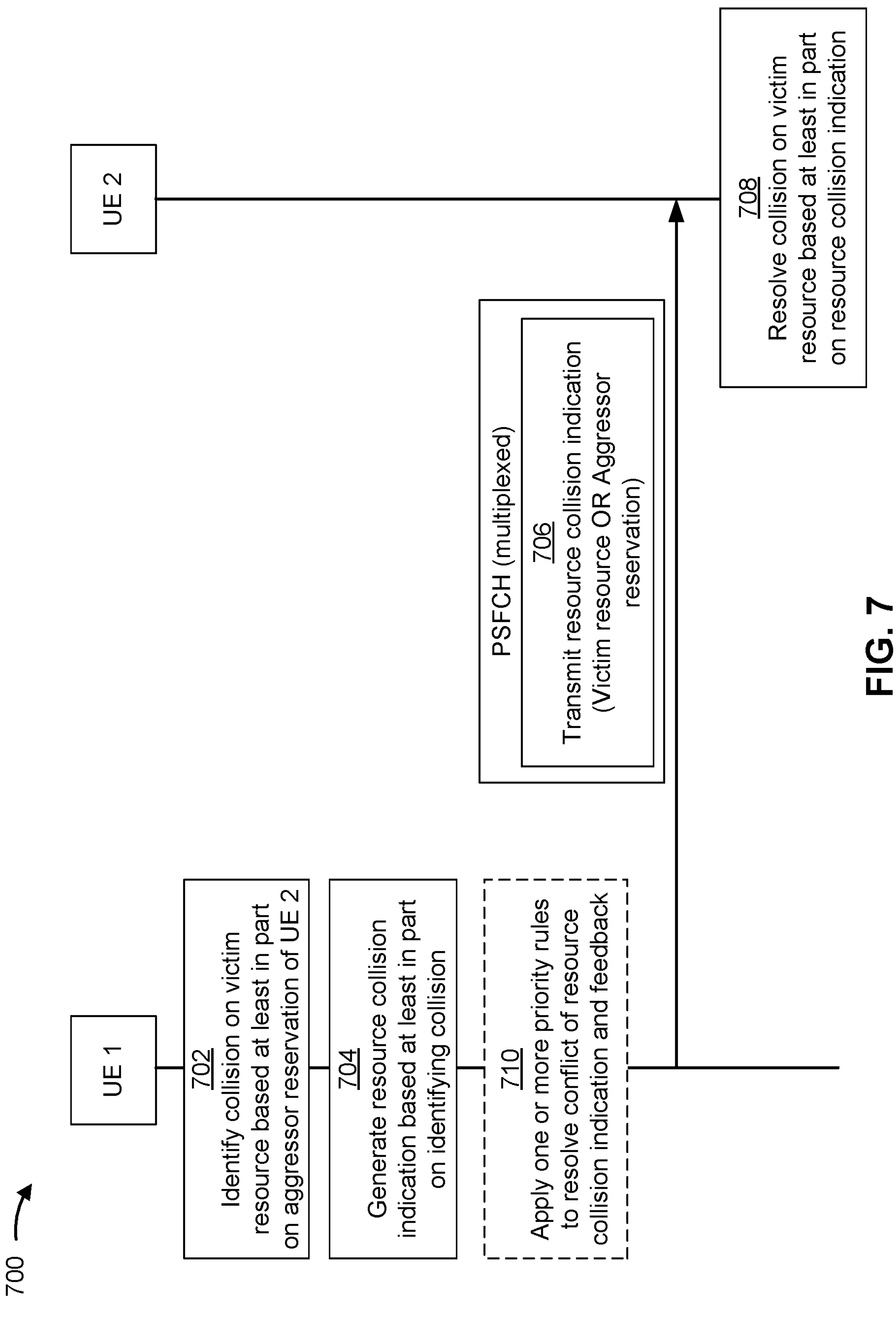
FIGS. 7-9 are diagrams illustrating examples associated with transmitting a resource collision indication on a sidelink feedback channel, in accordance with the present disclosure.

FIG. 7 is a diagram illustrating an example 700 associated with transmitting a resource collision indication on a sidelink feedback channel, in accordance with the present disclosure.

As shown by reference number 702, a first UE (UE 1) may identify (e.g., using antenna 252, demodulator 254, MIMO detector 256, receive processor 258, transmit processor 264, TX MIMO processor 266, modulator 254, controller/processor 280, memory 282, reception component 1302, and/or transmission component 1304) a collision on a victim resource based at least in part on an aggressor reservation transmitted by a second UE (UE 2). In other words, the second UE may transmit a reservation, and the first UE may detect that the reservation transmitted by the second UE is an aggressor reservation because the reservation from the second UE causes the collision on the victim resource. The victim resource may be associated with a time-frequency location in a PSSCH. For example, the victim resource may be associated with a slot i and a sub-channel j in the PSSCH.

As shown by reference 704, the first UE may generate (e.g., using antenna 252, demodulator 254, MIMO detector 256, receive processor 258, transmit processor 264, TX MIMO processor 266, modulator 254, controller/processor 280, memory 282, reception component 1302, and/or transmission component 1304) a resource collision indication based at least in part on identifying the collision on the victim resource. The resource collision indication may indicate the victim resource and/or the aggressor reservation transmitted by the second UE. The resource collision indication may be a sequence-based indication, and may include a resource-collision indication and/or already-reserved indication.

In some aspects, the first UE may map the resource collision indication to a sidelink resource that is not in use for sidelink feedback when the mapping of the resource collision indication is performed. The resource collision indication may be mapped to the sidelink resource not in use for sidelink feedback when the mapping of the resource collision indication is performed for unicast and groupcast transmissions (e.g., unicast and groupcast feedback option 1).

In some aspects, the first UE may map the resource collision indication to a sidelink resource that is not associated with feedback regarding a transmission (e.g., a data transmission) with the aggressor reservation or the victim resource. For example, the collision indication signal may be mapped to PSFCH resources not used for sidelink feedback of a PSCCH or a PSSCH involved in the collision. Alternatively, the resource collision indication may be mapped to a sidelink resource that is associated with feedback regarding the transmission with the aggressor reservation or the victim resource. For example, the collision indication signal may be mapped to PSFCH resources used for sidelink feedback of a PSCCH or a PSSCH involved in the collision.

In some aspects, the first UE may generate the resource collision indication using a different sequence than a sequence used to generate feedback regarding the transmission with the aggressor reservation or the victim resource. For example, the resource collision indication may use a sequence that is orthogonal to the sequence used to generate the feedback. As a result, the first UE may transmit both the resource collision indication and the feedback regarding the aggressor reservation using a sidelink resource.

In some aspects, the first UE may generate the resource collision indication using an extended sequence. The extended sequence may be extended relative to a sequence used to generate feedback regarding the transmission with the aggressor reservation or the victim resource. In other words, the extended sequence may be greater than (e.g., include a greater number of PRBs) as compared to the sequence used to generate the feedback. The extended sequence may be greater than one PRB, such that the extended sequence may span multiple PRBs.

In some aspects, the first UE may determine that one or more priority rules are not applicable at the first UE prior to transmitting the resource collision indication. For example, the first UE may determine that one or more priority rules are not applicable because the first UE is not attempting to receive feedback and transmit a resource collision indication on a sidelink resource of the PSFCH, transmit feedback and receive a resource collision indication on a sidelink resource of the PSFCH, or transmit feedback and transmit a resource collision indication on a sidelink resource of the PSFCH.

As shown by reference 706, the first UE may transmit (e.g., using antenna 252, demodulator 254, MIMO detector 256, receive processor 258, transmit processor 264, TX MIMO processor 266, modulator 254, controller/processor 280, memory 282, reception component 1302, and/or transmission component 1304) the resource collision indication to the second UE via a PSFCH. The resource collision indication transmitted via the PSFCH may indicate the victim resource and/or the aggressor reservation. The first UE may multiplex the resource collision indication on one or more sidelink resources that are useable for sidelink feedback. For example, the first UE may multiplex the resource collision indication on one or more PRBs of the PSFCH that are useable for sidelink feedback.

As shown by reference 708, the second UE may resolve (e.g., using antenna 252, demodulator 254, MIMO detector 256, receive processor 258, transmit processor 264, TX MIMO processor 266, modulator 254, controller/processor 280, memory 282, reception component 1302, and/or transmission component 1304) a collision on the victim resource based at least in part on the resource collision indication received from the first UE. For example, the second UE may perform an action to resolve the collision, which may include dropping a communication on the victim resource, delaying a communication on the victim resource, and/or rescheduling a communication on the victim resource. The communication may include a communication intended to be transmitted from the second UE using the victim resource. However, after receiving the resource collision indication from the first UE, the second UE may perform the action such that the communication is not performed using the victim resource.

In some aspects, the first UE may be a half-duplex UE and may not be permitted to perform both a transmission and a reception, or two transmissions or two receptions, in a sidelink resource of the PSFCH. The first UE may identify a conflict between transmission or reception of a resource collision indication and transmission or reception of another communication, such as feedback. The first UE may identify a conflict when the first UE is scheduled to receive feedback and transmit a resource collision indication on a sidelink resource of the PSFCH. The first UE may identify a conflict when the first UE is scheduled to transmit feedback and receive a resource collision indication on a sidelink resource of the PSFCH. The first UE may identify a conflict when the first UE is scheduled to transmit feedback and transmit a resource collision indication on a sidelink resource of the PSFCH.

As shown by reference 710, the first UE may resolve (e.g., using antenna 252, demodulator 254, MIMO detector 256, receive processor 258, transmit processor 264, TX MIMO processor 266, modulator 254, controller/processor 280, memory 282, reception component 1302, and/or transmission component 1304) the conflict based at least in part by applying one or more priority rules. The first UE may apply the priority rules to resolve the conflict between the transmission of the resource collision indication and another communication of the first UE, such as feedback. The first UE may apply the priority rules to resolve a conflict between receiving feedback and transmitting a resource collision indication on a sidelink resource of the PSFCH. The first UE may apply the priority rules to resolve a conflict between transmitting feedback and receiving a resource collision indication on a sidelink resource of the PSFCH. The first UE may apply the priority rules to resolve a conflict between transmitting feedback and transmitting a resource collision indication on a sidelink resource of the PSFCH.

In some aspects, the priority rules may indicate to the first UE to perform a communication of the resource collision indication and the other communication, such as feedback, that is associated with a higher priority level. For example, the first UE may determine, based at least in part on the priority rules, that receiving feedback is associated with a higher priority as compared to transmitting a resource collision indication on a sidelink resource of the PSFCH, or vice versa. The first UE may determine, based at least in part on the priority rules, that transmitting feedback is associated with a higher priority as compared to receiving a resource collision indication on a sidelink resource of the PSFCH, or vice versa. The first UE may determine, based at least in part on the priority rules, that transmitting feedback is associated with a higher priority as compared to transmitting a resource collision indication on a sidelink resource of the PSFCH, or vice versa.

In some aspects, the first UE may apply the priority rules to resolve the conflict prior to transmitting the resource collision indication, as shown by reference 708. For example, based at least in part on the priority rules, the first UE may determine to not receive feedback or not transmit feedback, and instead transmit the resource collision indication to the second UE on a sidelink resource of the PSFCH.

In some aspects, the first UE may resolve the conflict based at least in part on a capability of the first UE for concurrent transmission or reception. For example, when resolving a conflict between transmitting feedback and transmitting a resource collision indication on a sidelink resource, the first UE may perform a highest priority transmission according to the capability of the first UE.

In some aspects, the one or more priority rules may be based at least in part on a priority level of feedback, where the priority level may be based at least in part on a priority level of a PSCCH or a PSSCH associated with the feedback. In other words, the first UE may determine a priority for the feedback based at least in part on an associated PSCCH or an associated PSSCH.

In some aspects, the one or more priority rules may be based at least in part on a priority level of the resource collision indication. The priority level of the resource collision indication may be based at least in part on a priority level of a PSCCH or a PSSCH associated with the resource collision indication. In other words, the first UE may determine a priority for the resource collision indication based at least in part on an associated PSCCH or an associated PSSCH. Additionally or alternatively, the priority level of the resource collision indication may be pre-configured at the first UE. For example, the first UE may receive configuration information (e.g., from a base station, the second UE, or another device, such as another UE) indicating the priority level of the resource collision indication.

In some aspects, the first UE may resolve the conflict based at least in part on one or more priority level thresholds associated with the resource collision indication or the feedback. Priority level threshold(s) may be configured for the resource collision indication and/or the feedback. In other words, the first UE may determine whether to transmit or receive the resource collision indication and/or the feedback based at least in part on a priority level threshold. The first UE may determine not to transmit or receive the resource collision indication based at least in part on a priority level of the resource collision indication failing to satisfy the priority level threshold. The first UE may determine not to transmit or receive the feedback based at least in part on a priority level of the feedback failing to satisfy the priority level threshold.

As indicated above, FIG. 7 is provided as an example. Other examples may differ from what is described with respect to FIG. 7.

Figure 8:
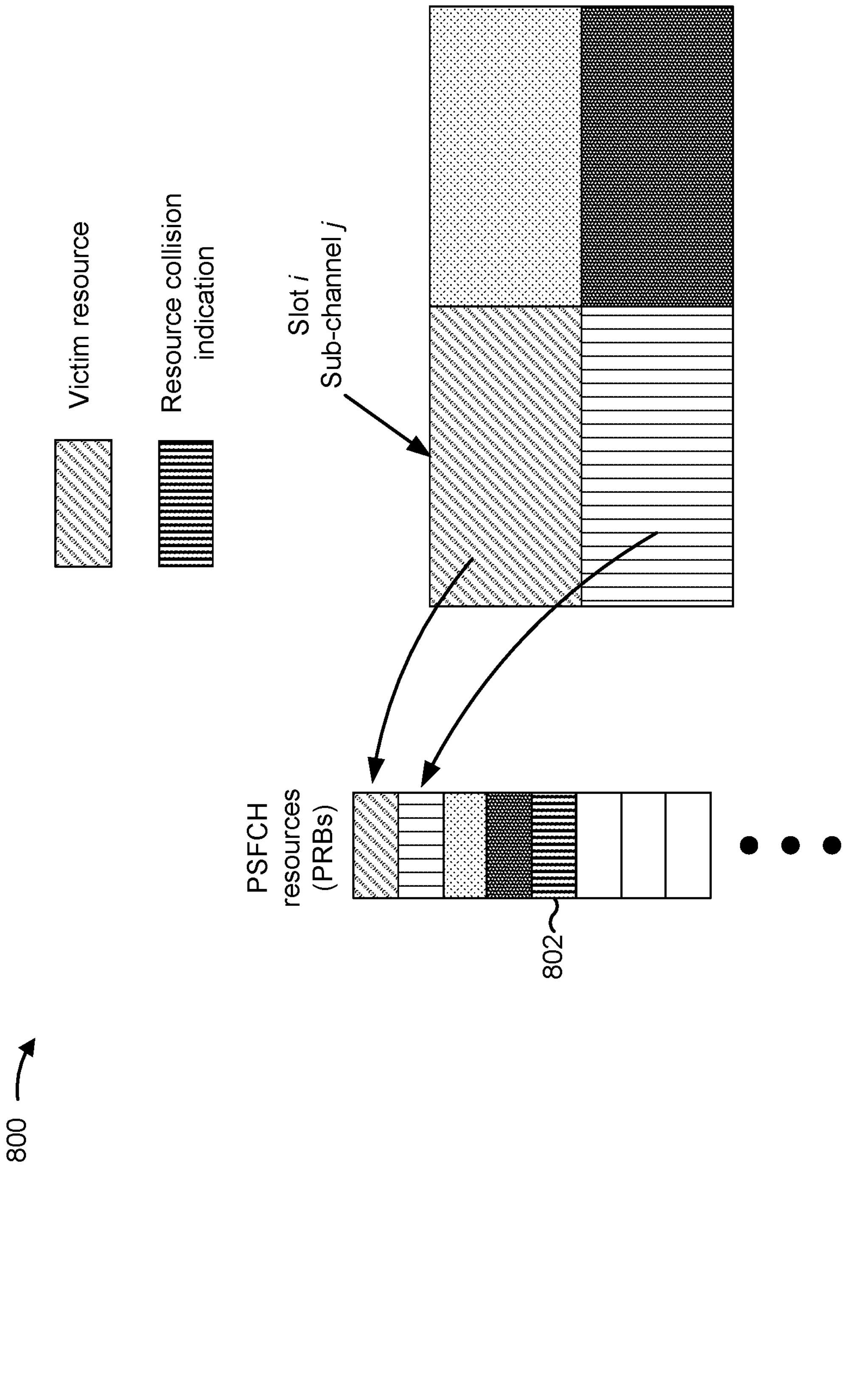

FIG. 8 is a diagram illustrating an example 800 associated with transmitting a resource collision indication on a sidelink feedback channel.

As shown in FIG. 8, a victim resource may occur in slot i, sub-channel j of a PSSCH. A resource collision indication 802 to indicate the victim resource may be mapped to a sidelink resource in a PSFCH that is not used for feedback. In some cases, the resource collision indication 802 to indicate the victim resource may be mapped to the sidelink resource in the PSFCH that is not used for feedback (e.g., for unicast and groupcast feedback option 1).

As indicated above, FIG. 8 is provided as an example. Other examples may differ from what is described with respect to FIG. 8.

Figure 9:
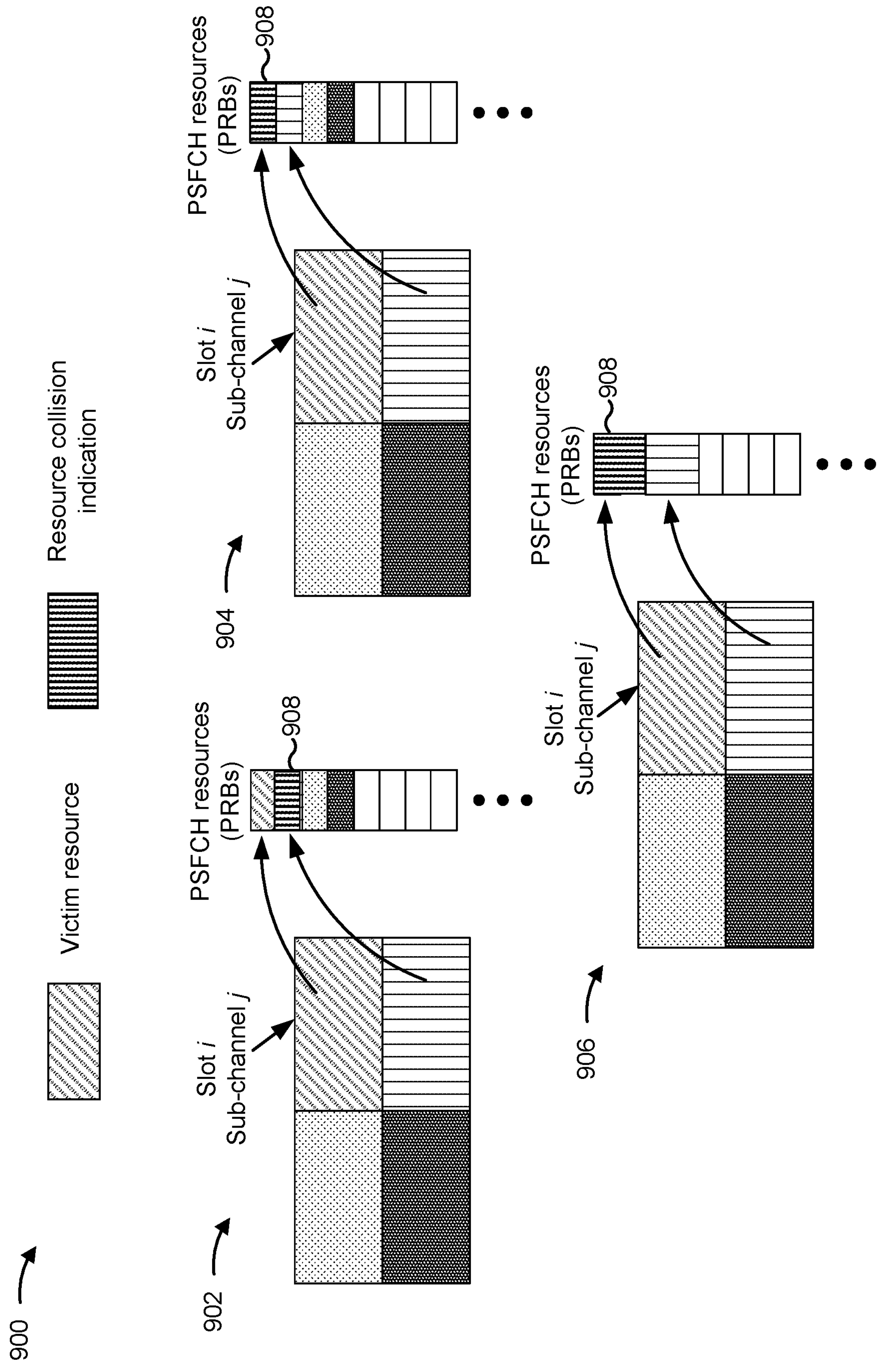

FIG. 9 is a diagram illustrating an example 900 associated with transmitting a resource collision indication on a sidelink feedback channel. The example 900 may include examples 902, 904, 906 associated with transmitting the resource collision indication on the sidelink feedback channel.

As shown by reference 902, a resource used to transmit an aggressor reservation that will cause a collision may occur in slot i, sub-channel j of a PSSCH. A resource collision indication 908 to indicate the aggressor reservation may be mapped to a sidelink resource in a PSFCH that is not used for feedback. The feedback may be associated with a resource of a PSCCH or a PSSCH involved in the collision.

As shown by reference 904, a resource used to transmit an aggressor reservation that will cause a collision may occur in slot i, sub-channel j of a PSSCH. A resource collision indication 908 to indicate the aggressor reservation may be mapped to a sidelink resource in a PSFCH that is used for feedback. The feedback may be associated with a resource of a PSCCH or a PSSCH involved in the collision.

As shown by reference 906, a resource used to transmit an aggressor reservation that will cause a collision may occur in slot i, sub-channel j of a PSSCH. A resource collision indication 908 to indicate the aggressor reservation may be mapped to a sidelink resource in a PSFCH that is used for feedback. The resource collision indication 908 may be a sequence having a length greater than one PRB (e.g., two PRBs).

As indicated above, FIG. 9 is provided as an example. Other examples may differ from what is described with respect to FIG. 9.

Figure 10:
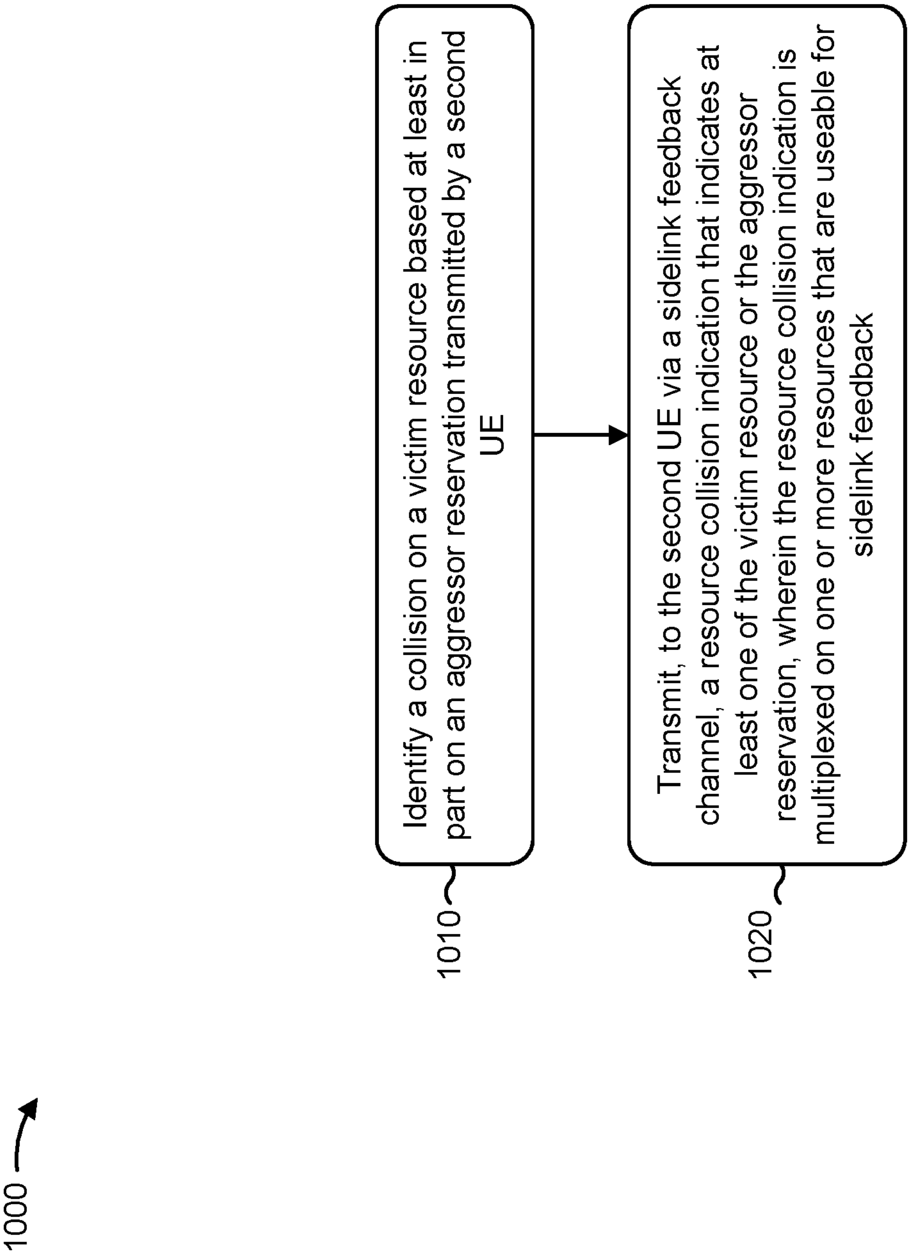
FIGS. 10-11 are diagrams illustrating example processes associated with transmitting a resource collision indication on a sidelink feedback channel, in accordance with the present disclosure.

FIG. 10 is a diagram illustrating an example process 1000 performed, for example, by a first UE, in accordance with the present disclosure. Example process 1000 is an example where the UE (e.g., UE 120) performs operations associated with transmitting a resource collision indication on a sidelink feedback channel.

As shown in FIG. 10, in some aspects, process 1000 may include identifying a collision on a victim resource based at least in part on an aggressor reservation transmitted by a second UE (block 1010). For example, the first UE (e.g., using antenna 252, demodulator 254, MIMO detector 256, receive processor 258, transmit processor 264, TX MIMO processor 266, modulator 254, controller/processor 280, and/or memory 282) may identify a collision on a victim resource based at least in part on an aggressor reservation transmitted by a second UE, as described above with regard to reference number 702 in FIG. 7.

As further shown in FIG. 10, in some aspects, process 1000 may include transmitting, to the second UE via a sidelink feedback channel, a resource collision indication that indicates at least one of the victim resource or the aggressor reservation, wherein the resource collision indication is multiplexed on one or more resources that are useable for sidelink feedback (block 1020). For example, the first UE (e.g., using antenna 252, transmit processor 264, TX MIMO processor 266, modulator 254, controller/processor 280, and/or memory 282) may transmit, to the second UE via a sidelink feedback channel, a resource collision indication that indicates at least one of the victim resource or the aggressor reservation, wherein the resource collision indication is multiplexed on one or more resources that are useable for sidelink feedback, as described above with regard to reference number 706 in FIG. 7.

Process 1000 may include additional aspects, such as any single aspect or any combination of aspects described below and/or in connection with one or more other processes described elsewhere herein.

In a first aspect, the resource collision indication is mapped to a resource that is not in use for sidelink feedback when the mapping of the resource collision indication is performed. In a second aspect, alone or in combination with the first aspect, the resource collision indication is mapped to a resource that is not associated with feedback regarding a transmission with the aggressor reservation or the victim resource. In a third aspect, alone or in combination with one or more of the first and second aspects, the resource collision indication is mapped to a resource that is associated with feedback regarding a transmission with the aggressor reservation or the victim resource.

In a fourth aspect, alone or in combination with one or more of the first through third aspects, process 1000 includes generating the resource collision indication using a different sequence than a sequence used to generate feedback regarding a transmission with the aggressor reservation or the victim resource. In a fifth aspect, alone or in combination with one or more of the first through fourth aspects, process 1000 includes generating the resource collision indication using an extended sequence, wherein the extended sequence is extended relative to a sequence used to generate feedback regarding a transmission with the aggressor reservation or the victim resource. In a sixth aspect, alone or in combination with one or more of the first through fifth aspects, the extended sequence spans multiple resource blocks.

In a seventh aspect, alone or in combination with one or more of the first through sixth aspects, process 1000 includes identifying a conflict between transmission of the resource collision indication and another communication of the first UE, and resolving the conflict based at least in part on one or more priority rules, wherein transmitting the resource collision indication is based at least in part on resolving the conflict. In an eighth aspect, alone or in combination with one or more of the first through seventh aspects, the one or more priority rules indicate to perform a communication of the resource collision indication and the other communication that is associated with a highest priority level.

In a ninth aspect, alone or in combination with one or more of the first through eighth aspects, resolving the conflict is based at least in part on a capability of the first UE for concurrent transmission or reception. In a tenth aspect, alone or in combination with one or more of the first through ninth aspects, the one or more priority rules are based at least in part on a priority level of the other communication, wherein the priority level is based at least in part on a priority level of a sidelink control channel or a sidelink shared channel associated with the other communication.

In an eleventh aspect, alone or in combination with one or more of the first through tenth aspects, process 1000 includes receiving configuration information indicating a priority level of the resource collision indication, wherein the one or more priority rules are based at least in part on the priority level of the resource collision indication. In a twelfth aspect, alone or in combination with one or more of the first through eleventh aspects, the one or more priority rules are based at least in part on a priority level of the resource collision indication, wherein the priority level is based at least in part on a priority level of a sidelink control channel or a sidelink shared channel associated with the resource collision indication. In a thirteenth aspect, alone or in combination with one or more of the first through twelfth aspects, resolving the conflict is based at least in part on one or more priority level thresholds associated with the resource collision indication or the other communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
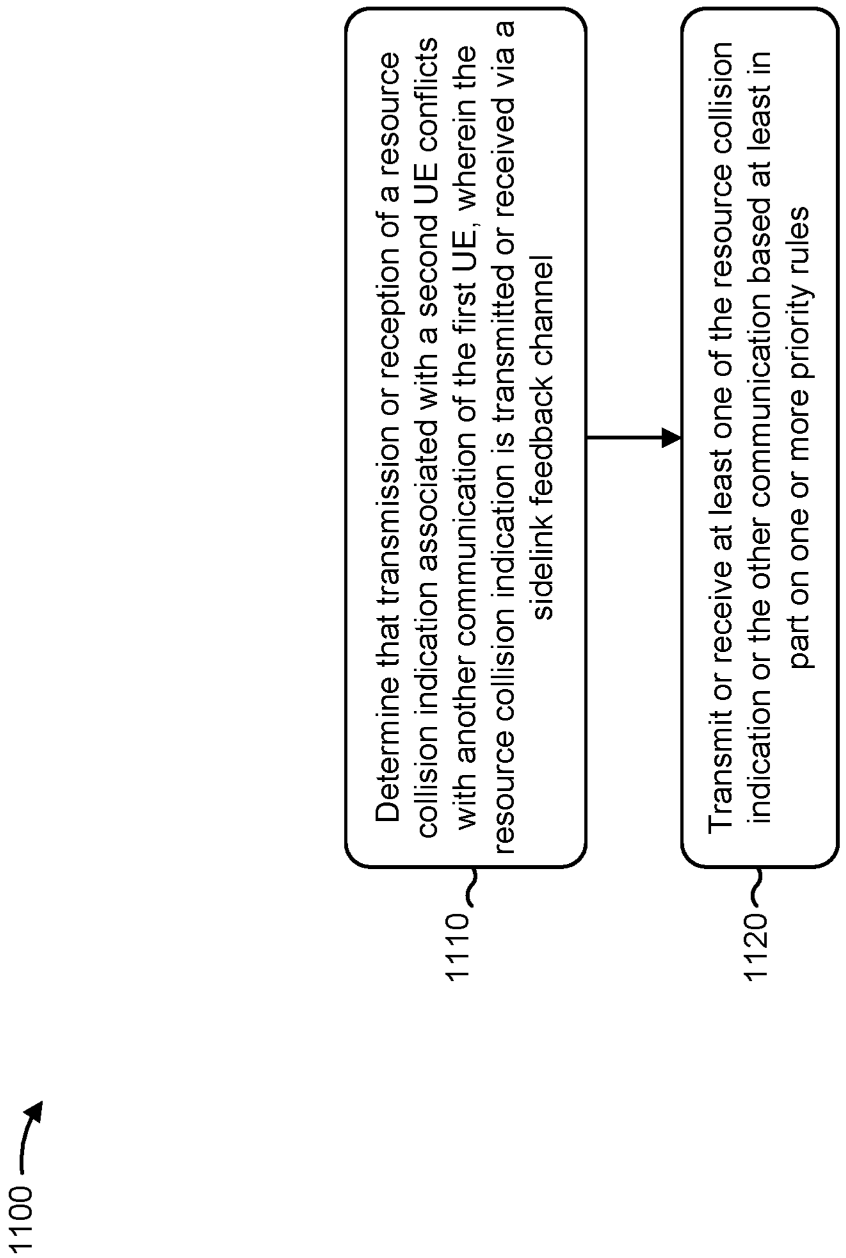

FIG. 11 is a diagram illustrating an example process 1100 performed, for example, by a first UE, in accordance with the present disclosure. Example process 1100 is an example where the first UE (e.g., UE 120) performs operations associated with transmitting a resource collision indication on a sidelink feedback channel.

As shown in FIG. 11, in some aspects, process 1100 may include determining that transmission or reception of a resource collision indication associated with a second UE conflicts with another communication of the first UE, wherein the resource collision indication is transmitted or received via a sidelink feedback channel (block 1110). For example, the first UE (e.g., using antenna 252, demodulator 254, MIMO detector 256, receive processor 258, transmit processor 264, TX MIMO processor 266, modulator 254, controller/processor 280, and/or memory 282) may determine that transmission or reception of a resource collision indication associated with a second UE conflicts with another communication of the first UE, wherein the resource collision indication is transmitted or received via a sidelink feedback channel, as described above with regard to reference number 702 in FIG. 7.

As further shown in FIG. 11, in some aspects, process 1100 may include transmitting or receiving at least one of the resource collision indication or the other communication based at least in part on one or more priority rules (block 1120). For example, the first UE (e.g., using antenna 252, transmit processor 264, TX MIMO processor 266, modulator 254, controller/processor 280, and/or memory 282) may transmit or receiving at least one of the resource collision indication or the other communication based at least in part on one or more priority rules, as described above with regard to reference number 706 in FIG. 7.

Process 1100 may include additional aspects, such as any single aspect or any combination of aspects described below and/or in connection with one or more other processes described elsewhere herein.

In a first aspect, the one or more priority rules indicate to perform a communication of the resource collision indication and the other communication that is associated with a highest priority level. In a second aspect, alone or in combination with the first aspect, the one or more priority rules are based at least in part on a capability of the first UE for concurrent transmission or reception.

In a third aspect, alone or in combination with one or more of the first and second aspects, the one or more priority rules are based at least in part on a priority level of the other communication, wherein the priority level is based at least in part on a priority level of a sidelink control channel or a sidelink shared channel associated with the other communication. In a fourth aspect, alone or in combination with one or more of the first through third aspects, process 1100 includes receiving configuration information indicating a priority level of the resource collision indication, wherein the one or more priority rules are based at least in part on the priority level of the resource collision indication.

In a fifth aspect, alone or in combination with one or more of the first through fourth aspects, the one or more priority rules are based at least in part on a priority level of the resource collision indication, wherein the priority level is based at least in part on a priority level of a sidelink control channel or a sidelink shared channel associated with the resource collision indication. In a sixth aspect, alone or in combination with one or more of the first through fifth aspects, process 1100 includes determining whether to transmit or receive at least one of the resource collision indication or the other communication based at least in part on a threshold priority level.

In a seventh aspect, alone or in combination with one or more of the first through sixth aspects, determining whether to transmit or receive at least one of the resource collision indication or the other communication based at least in part on the threshold priority level further comprises determining not to transmit or receive the resource collision indication based at least in part on a priority level of the resource collision indication failing to satisfy the threshold priority level. In an eighth aspect, alone or in combination with one or more of the first through seventh aspects, determining whether to transmit or receive at least one of the resource collision indication or the other communication based at least in part on the threshold priority level further comprises determining not to transmit or receive the other communication based at least in part on a priority level of the other communication failing to satisfy the threshold priority level.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
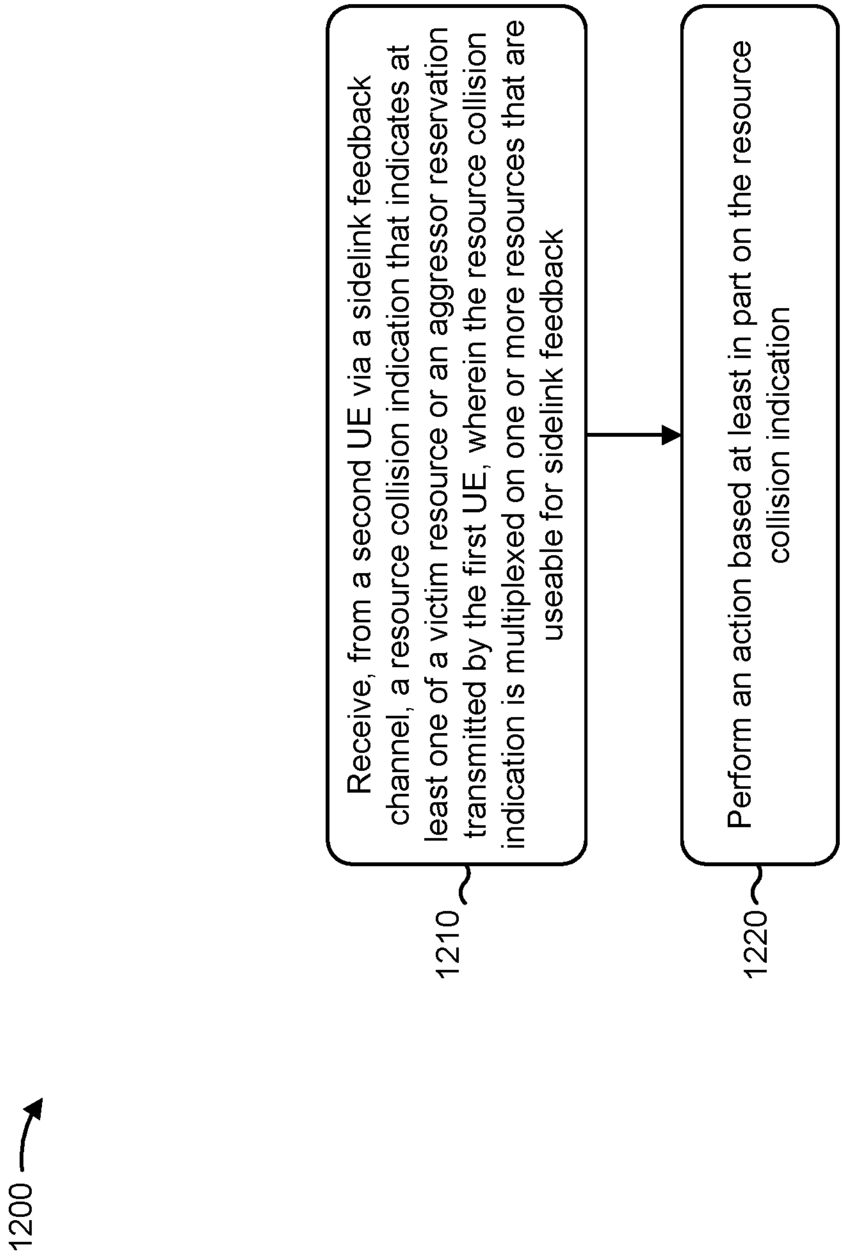
FIG. 12 is a diagram illustrating an example process associated with receiving a resource collision indication on a sidelink feedback channel, in accordance with the present disclosure.

FIG. 12 is a diagram illustrating an example process 1200 performed, for example, by a first UE, in accordance with the present disclosure. Example process 1200 is an example where the first UE (e.g., UE 120) performs operations associated with receiving a resource collision indication on a sidelink feedback channel.

As shown in FIG. 12, in some aspects, process 1200 may include receiving, from a second UE via a sidelink feedback channel, a resource collision indication that indicates at least one of a victim resource or an aggressor reservation transmitted by the first UE, wherein the resource collision indication is multiplexed on one or more resources that are useable for sidelink feedback (block 1210). For example, the first UE (e.g., using antenna 252, demodulator 254, MIMO detector 256, receive processor 258, controller/processor 280, and/or memory 282) may receive, from a second UE via a sidelink feedback channel, a resource collision indication that indicates at least one of a victim resource or an aggressor reservation transmitted by the first UE, wherein the resource collision indication is multiplexed on one or more resources that are useable for sidelink feedback, as described above with regard to reference number 706 in FIG. 7.

As further shown in FIG. 12, in some aspects, process 1200 may include performing an action based at least in part on the resource collision indication (block 1220). For example, the first UE (e.g., using antenna 252, demodulator 254, MIMO detector 256, receive processor 258, transmit processor 264, TX MIMO processor 266, modulator 254, controller/processor 280, and/or memory 282) may perform an action based at least in part on the resource collision indication, as described above with regard to reference number 708 in FIG. 7.

Process 1200 may include additional aspects, such as any single aspect or any combination of aspects described below and/or in connection with one or more other processes described elsewhere herein.

In a first aspect, the resource collision indication is mapped to a resource that is not in use for sidelink feedback when the mapping of the resource collision indication is performed. In a second aspect, alone or in combination with the first aspect, the resource collision indication is mapped to a resource that is not associated with feedback regarding a transmission with the aggressor reservation or the victim resource. In a third aspect, alone or in combination with one or more of the first and second aspects, the resource collision indication is mapped to a resource that is associated with feedback regarding a transmission with the aggressor reservation or the victim resource.

In a fourth aspect, alone or in combination with one or more of the first through third aspects, the resource collision indication uses a different sequence than a sequence used to generate feedback regarding a transmission with the aggressor reservation or the victim resource. In a fifth aspect, alone or in combination with one or more of the first through fourth aspects, the resource collision indication uses an extended sequence, wherein the extended sequence is extended relative to a sequence used to generate feedback regarding a transmission with the aggressor reservation or the victim resource. In a sixth aspect, alone or in combination with one or more of the first through fifth aspects, the sequence spans multiple resource blocks.

In a seventh aspect, alone or in combination with one or more of the first through sixth aspects, process 1200 includes identifying a conflict between reception of the resource collision indication and another communication of the first UE, and resolving the conflict based at least in part on one or more priority rules, wherein receiving the resource collision indication is based at least in part on resolving the conflict. In an eighth aspect, alone or in combination with one or more of the first through seventh aspects, the one or more priority rules indicate to perform a communication of the resource collision indication and the other communication that is associated with a highest priority level.

In a ninth aspect, alone or in combination with one or more of the first through eighth aspects, resolving the conflict is based at least in part on a capability of the first UE for concurrent transmission or reception. In a tenth aspect, alone or in combination with one or more of the first through ninth aspects, the one or more priority rules are based at least in part on a priority level of the other communication, wherein the priority level is based at least in part on a priority level of a sidelink control channel or a sidelink shared channel associated with the other communication. In an eleventh aspect, alone or in combination with one or more of the first through tenth aspects, process 1200 includes receiving configuration information indicating a priority level of the resource collision indication, wherein the one or more priority rules are based at least in part on the priority level of the resource collision indication.

In a twelfth aspect, alone or in combination with one or more of the first through eleventh aspects, the one or more priority rules are based at least in part on a priority level of the resource collision indication, wherein the priority level is based at least in part on a priority level of a sidelink control channel or a sidelink shared channel associated with the resource collision indication. In a thirteenth aspect, alone or in combination with one or more of the first through twelfth aspects, resolving the conflict is based at least in part on one or more priority level thresholds associated with the resource collision indication or the other communication. In a fourteenth aspect, alone or in combination with one or more of the first through thirteenth aspects, the action comprises dropping, delaying, or rescheduling a communication on the victim resource.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
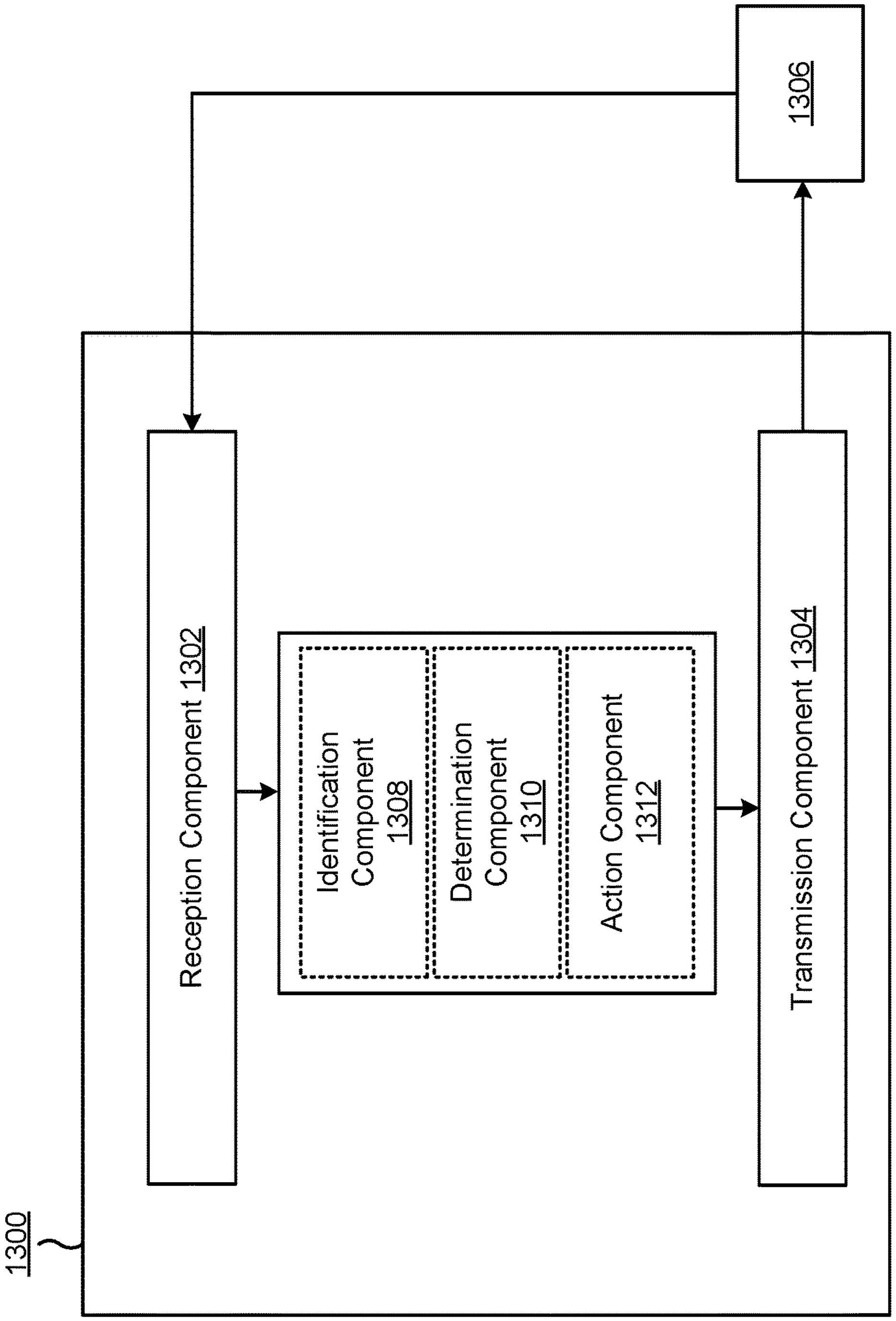
FIG. 13 is a block diagram of an example apparatus for wireless communication, in accordance with the present disclosure.

FIG. 13 is a block diagram of an example apparatus 1300 for wireless communication. The apparatus 1300 may be a first user equipment (UE), or a first user equipment (UE) may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of an identification component 1308, a determination component 1310, or an action component 1312, among other examples.

In some aspects, the apparatus 1300 may be configured to perform one or more operations described herein in connection with FIGS. 5-9. Additionally or alternatively, the apparatus 1300 may be configured to perform one or more processes described herein, such as process 1000 of FIG. 10, process 1100 of FIG. 11, process 1200 of FIG. 12, or a combination thereof. In some aspects, the apparatus 1300 and/or one or more components shown in FIG. 13 may include one or more components of the first UE described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the first user equipment (UE) described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the first user equipment (UE) described above in connection with FIG. 2. In some aspects, the transmission component 1304 may be co-located with the reception component 1302 in a transceiver.

The identification component 1308 may identify a collision on a victim resource based at least in part on an aggressor reservation transmitted by a second UE. The transmission component 1304 may transmit, to the second UE via a sidelink feedback channel, a resource collision indication that indicates at least one of the victim resource or the aggressor reservation, wherein the resource collision indication is multiplexed on one or more resources that are useable for sidelink feedback.

The determination component 1310 may determine that transmission or reception of a resource collision indication associated with a second UE conflicts with another communication of the first UE, wherein the resource collision indication is transmitted or received via a sidelink feedback channel. The transmission component 1304 may transmit or receiving at least one of the resource collision indication or the other communication based at least in part on one or more priority rules.

The reception component 1302 may receive, from a second UE via a sidelink feedback channel, a resource collision indication that indicates at least one of a victim resource or an aggressor reservation transmitted by the first UE, wherein the resource collision indication is multiplexed on one or more resources that are useable for sidelink feedback. The action component 1312 may perform an action based at least in part on the resource collision indication.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first user equipment (UE), comprising: identifying a collision on a victim resource based at least in part on an aggressor reservation transmitted by a second UE; and transmitting, to the second UE via a sidelink feedback channel, a resource collision indication that indicates at least one of the victim resource or the aggressor reservation, wherein the resource collision indication is multiplexed on one or more resources that are useable for sidelink feedback.

Aspect 2: The method of Aspect 1, wherein the resource collision indication is mapped to a resource that is not in use for sidelink feedback when the mapping of the resource collision indication is performed.

Aspect 3: The method of any of Aspects 1 through 2, wherein the resource collision indication is mapped to a resource that is not associated with feedback regarding a transmission with the aggressor reservation or the victim resource.

Aspect 4: The method of any of Aspects 1 through 3, wherein the resource collision indication is mapped to a resource that is associated with feedback regarding a transmission with the aggressor reservation or the victim resource.

Aspect 5: The method of any of Aspects 1 through 4, further comprising: generating the resource collision indication using a different sequence than a sequence used to generate feedback regarding a transmission with the aggressor reservation or the victim resource.

Aspect 6: The method of any of Aspects 1 through 5, further comprising: generating the resource collision indication using an extended sequence, wherein the extended sequence is extended relative to a sequence used to generate feedback regarding a transmission with the aggressor reservation or the victim resource.

Aspect 7: The method of Aspect 6, wherein the extended sequence spans multiple resource blocks.

Aspect 8: The method of any of Aspects 1 through 7, further comprising: identifying a conflict between transmission of the resource collision indication and another communication of the first UE; and resolving the conflict based at least in part on one or more priority rules, wherein transmitting the resource collision indication is based at least in part on resolving the conflict.

Aspect 9: The method of Aspect 8, wherein the one or more priority rules indicate to perform a communication of the resource collision indication and the other communication that is associated with a highest priority level.

Aspect 10: The method of Aspect 8, wherein resolving the conflict is based at least in part on a capability of the first UE for concurrent transmission or reception.

Aspect 11: The method of Aspect 8, wherein the one or more priority rules are based at least in part on a priority level of the other communication, wherein the priority level is based at least in part on a priority level of a sidelink control channel or a sidelink shared channel associated with the other communication.

Aspect 12: The method of Aspect 8, further comprising: receiving configuration information indicating a priority level of the resource collision indication, wherein the one or more priority rules are based at least in part on the priority level of the resource collision indication.

Aspect 13: The method of Aspect 8, wherein the one or more priority rules are based at least in part on a priority level of the resource collision indication, wherein the priority level is based at least in part on a priority level of a sidelink control channel or a sidelink shared channel associated with the resource collision indication.

Aspect 14: The method of Aspect 8, wherein resolving the conflict is based at least in part on one or more priority level thresholds associated with the resource collision indication or the other communication.

Aspect 15: A method of wireless communication performed by a first user equipment (UE), comprising: receiving, from a second UE via a sidelink feedback channel, a resource collision indication that indicates at least one of a victim resource or an aggressor reservation transmitted by the first UE, wherein the resource collision indication is multiplexed on one or more resources that are useable for sidelink feedback; and performing an action based at least in part on the resource collision indication.

Aspect 16: The method of Aspect 15, wherein: the resource collision indication is mapped to a resource that is not in use for sidelink feedback when the mapping of the resource collision indication is performed; the resource collision indication is mapped to a resource that is not associated with feedback regarding a transmission with the aggressor reservation or the victim resource; or the resource collision indication is mapped to a resource that is associated with feedback regarding a transmission with the aggressor reservation or the victim resource.

Aspect 17: The method of any of Aspects 15 through 16, wherein: the resource collision indication uses a different sequence than a sequence used to generate feedback regarding a transmission with the aggressor reservation or the victim resource; or the resource collision indication uses an extended sequence, wherein the extended sequence is extended relative to a sequence used to generate feedback regarding a transmission with the aggressor reservation or the victim resource, and wherein the sequence spans multiple resource blocks.

Aspect 18: The method of any of Aspects 15 through 17, further comprising: identifying a conflict between reception of the resource collision indication and another communication of the first UE; and resolving the conflict based at least in part on one or more priority rules, wherein receiving the resource collision indication is based at least in part on resolving the conflict.

Aspect 19: The method of Aspect 18, wherein: the one or more priority rules indicate to perform a communication of the resource collision indication and the other communication that is associated with a highest priority level; the one or more priority rules are based at least in part on a priority level of the other communication, wherein the priority level is based at least in part on a priority level of a sidelink control channel or a sidelink shared channel associated with the other communication; or the one or more priority rules are based at least in part on a priority level of the resource collision indication, wherein the priority level is based at least in part on a priority level of a sidelink control channel or a sidelink shared channel associated with the resource collision indication.

Aspect 20: The method of any of Aspects 15 through 19, wherein: resolving the conflict is based at least in part on a capability of the first UE for concurrent transmission or reception; or resolving the conflict is based at least in part on one or more priority level thresholds associated with the resource collision indication or the other communication.

Aspect 21: The method of any of Aspects 15 through 20, further comprising: receiving configuration information indicating a priority level of the resource collision indication, wherein one or more priority rules are based at least in part on the priority level of the resource collision indication.

Aspect 22: The method of any of Aspects 15 through 21, wherein the action comprises dropping, delaying, or rescheduling a communication on the victim resource.

Aspect 23: An apparatus for wireless communication at a device, comprising a processor; memory coupled with the processor; and instructions stored in the memory and executable by the processor to cause the apparatus to perform the method of one or more of Aspects 1-14.

Aspect 24: A device for wireless communication, comprising a memory and one or more processors coupled to the memory, the one or more processors configured to perform the method of one or more of Aspects 1-14.

Aspect 25: An apparatus for wireless communication, comprising at least one means for performing the method of one or more of Aspects 1-14.

Aspect 26: A non-transitory computer-readable medium storing code for wireless communication, the code comprising instructions executable by a processor to perform the method of one or more of Aspects 1-14.

Aspect 27: A non-transitory computer-readable medium storing a set of instructions for wireless communication, the set of instructions comprising one or more instructions that, when executed by one or more processors of a device, cause the device to perform the method of one or more of Aspects 1-14.

Aspect 28: An apparatus for wireless communication at a device, comprising a processor; memory coupled with the processor; and instructions stored in the memory and executable by the processor to cause the apparatus to perform the method of one or more of Aspects 15-22.

Aspect 29: A device for wireless communication, comprising a memory and one or more processors coupled to the memory, the one or more processors configured to perform the method of one or more of Aspects 15-22.

Aspect 30: An apparatus for wireless communication, comprising at least one means for performing the method of one or more of Aspects 15-22.

Aspect 31: A non-transitory computer-readable medium storing code for wireless communication, the code comprising instructions executable by a processor to perform the method of one or more of Aspects 15-22.

Aspect 32: A non-transitory computer-readable medium storing a set of instructions for wireless communication, the set of instructions comprising one or more instructions that, when executed by one or more processors of a device, cause the device to perform the method of one or more of Aspects 15-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:

identifying a collision on a victim resource based at least in part on an aggressor reservation transmitted by a second UE; and transmitting, to the second UE via a sidelink feedback channel, a resource collision indication that is associated with at least one of the victim resource or the aggressor reservation, wherein the resource collision indication is multiplexed on one or more physical sidelink feedback channel (PSFCH) resources, wherein the resource collision indication indicates a sidelink resource that is in conflict between the first UE and the second UE and that is the victim resource, and wherein the resource collision indication is associated with a cyclic shift.

2. The method of claim 1, wherein the resource collision indication is mapped to a resource that is not in use for another feedback communication when the mapping of the resource collision indication is performed.

3. The method of claim 1, wherein the resource collision indication is mapped to a resource that is not associated with a transmission with the aggressor reservation or the victim resource.

4. The method of claim 1, wherein the resource collision indication is mapped to a resource that is associated with feedback regarding a transmission with the aggressor reservation or the victim resource.

5. The method of claim 1, wherein the resource collision indication is a sequence-based resource collision indication.

6. The method of claim 5, further comprising:

generating the resource collision indication using a different sequence than a sequence used to generate feedback regarding a transmission with the aggressor reservation or the victim resource.

7. The method of claim 5, further comprising:

generating the resource collision indication using an extended sequence, wherein the extended sequence is extended relative to a sequence used to generate feedback regarding a transmission with the aggressor reservation or the victim resource.

8. The method of claim 7, wherein the extended sequence spans multiple resource blocks.

9. The method of claim 1, wherein the resource collision indication is associated with feedback regarding a transmission with the aggressor reservation or the victim resource.

10. The method of claim 1, further comprising:
identifying a conflict between transmission of the resource collision indication and another communication of the first UE; and
resolving the conflict based at least in part on one or more priority rules, wherein transmitting the resource collision indication is based at least in part on resolving the conflict.

11. The method of claim 10, wherein the one or more priority rules indicate to perform a communication of the resource collision indication and the other communication that is associated with a highest priority level.

12. The method of claim 10, wherein resolving the conflict is based at least in part on a capability of the first UE for concurrent transmission or reception.

13. The method of claim 10, wherein the one or more priority rules are based at least in part on a priority level of the other communication, wherein the priority level of the other communication is based at least in part on a priority level of a sidelink control channel or a sidelink shared channel associated with the other communication.

14. The method of claim 10, further comprising:
receiving configuration information indicating a priority level of the resource collision indication, wherein the one or more priority rules are based at least in part on the priority level of the resource collision indication.

15. The method of claim 10, wherein the one or more priority rules are based at least in part on a priority level of the resource collision indication, wherein the priority level of the resource collision indication is based at least in part on a priority level of a sidelink control channel or a sidelink shared channel associated with the resource collision indication.

16. The method of claim 10, wherein resolving the conflict is based at least in part on one or more priority level thresholds associated with the resource collision indication.

17. The method of claim 10, wherein resolving the conflict is based at least in part on the other communication.

18. A method of wireless communication performed by a first user equipment (UE), comprising:
receiving, from a second UE via a sidelink feedback channel, a resource collision indication that is associated with at least one of an aggressor reservation transmitted by the first UE or a victim resource that is in conflict between the first UE and the second UE, wherein the resource collision indication is based at least in part on a collision on the victim resource and is multiplexed on one or more resources that are useable for sidelink feedback, and wherein the resource collision indication indicates a sidelink resource that is in conflict between the first UE and the second UE and that is the victim resource; and
performing an action based at least in part on the resource collision indication, wherein the resource collision indication is associated with a cyclic shift.

19. The method of claim 18, wherein:
the resource collision indication is mapped to a resource that is not in use for another feedback communication when the mapping of the resource collision indication is performed;
the resource collision indication is mapped to a resource that is not associated with a transmission with the aggressor reservation or the victim resource; or
the resource collision indication is mapped to a resource that is associated with the transmission with the aggressor reservation or the victim resource.

20. The method of claim 18, wherein:
the resource collision indication uses a different sequence than a sequence used to generate feedback regarding a transmission with the aggressor reservation or the victim resource; or
the resource collision indication uses an extended sequence, wherein the extended sequence is extended relative to the sequence used to generate the feedback regarding the transmission with the aggressor reservation or the victim resource, and wherein the extended sequence spans multiple resource blocks.

21. The method of claim 18, further comprising:
identifying a conflict between reception of the resource collision indication and another communication of the first UE; and
resolving the conflict based at least in part on one or more priority rules, wherein receiving the resource collision indication is based at least in part on resolving the conflict.

22. The method of claim 21, wherein:
the one or more priority rules indicate to perform a communication of the resource collision indication and the other communication that is associated with a highest priority level;
the one or more priority rules are based at least in part on a priority level of the other communication, wherein the priority level of the other communication is based at least in part on a priority level of a sidelink control channel or a sidelink shared channel associated with the other communication; or
the one or more priority rules are based at least in part on a priority level of the resource collision indication, wherein the priority level of the resource collision indication is based at least in part on a priority level of a sidelink control channel or a sidelink shared channel associated with the resource collision indication.

23. A first user equipment (UE) for wireless communication, comprising:
one or more memories; and
one or more processors, coupled to the one or more memories, configured to:
identify a collision on a victim resource based at least in part on an aggressor reservation transmitted by a second UE; and
transmit, to the second UE via a sidelink feedback channel, a resource collision indication that is associated with at least one of the victim resource or the aggressor reservation, wherein the resource collision indication is multiplexed on one or more physical sidelink feedback channel (PSFCH) resources, wherein the resource collision indication indicates a sidelink resource that is in conflict between the first UE and the second UE and that is the victim resource, and wherein the resource collision indication is associated with a cyclic shift.

24. The first UE of claim 23, wherein:
the resource collision indication is mapped to a resource that is not in use for another feedback communication when the mapping of the resource collision indication is performed;
the resource collision indication is mapped to a resource that is not associated with a transmission with the aggressor reservation or the victim resource; or
the resource collision indication is mapped to a resource that is associated with feedback regarding the transmission with the aggressor reservation or the victim resource.

25. The first UE of claim 23, wherein the resource collision indication is a sequence-based resource collision indication.

26. The first UE of claim 25, wherein the one or more processors are further configured to:

generate the resource collision indication using a different sequence than a sequence used to generate feedback regarding a transmission with the aggressor reservation or the victim resource; or generate the resource collision indication using an extended sequence, wherein the extended sequence is extended relative to the sequence used to generate the feedback regarding the transmission with the aggressor reservation or the victim resource, and wherein the extended sequence spans multiple resource blocks.

27. The first UE of claim 23, wherein the resource collision indication is associated with feedback regarding a transmission with the aggressor reservation or the victim resource.

28. The first UE of claim 23, wherein the one or more processors are further configured to:

identify a conflict between transmission of the resource collision indication and another communication of the first UE; and resolve the conflict based at least in part on one or more priority rules, wherein transmitting the resource collision indication is based at least in part on resolving the conflict.

29. The first UE of claim 28, wherein, to resolve the conflict, the one or more processors are configured to: resolve the conflict based at least in part on the other communication.

30. A first user equipment (UE) for wireless communication, comprising:

one or more memories; and one or more processors, coupled to the one or more memories, configured to:

receive, from a second UE via a sidelink feedback channel, a resource collision indication that is associated with at least one of an aggressor reservation transmitted by the first UE or a victim resource that is in conflict between the first UE and the second UE, wherein the resource collision indication is based at least in part on a collision on the victim resource and is multiplexed on one or more resources that are useable for sidelink feedback, and wherein the resource collision indication indicates a sidelink resource that is in conflict between the first UE and the second UE and that is the victim resource; and perform an action based at least in part on the resource collision indication, wherein the resource collision indication is associated with a cyclic shift.

* * * * *